US011068085B2

(12) United States Patent
Zhang

(10) Patent No.: US 11,068,085 B2
(45) Date of Patent: Jul. 20, 2021

(54) METHOD FOR PROCESSING TOUCH SCREEN TERMINAL OBJECT AND TOUCH SCREEN TERMINAL

(71) Applicant: Huawei Device Co., Ltd., Dongguan (CN)

(72) Inventor: Ting Zhang, Shenzhen (CN)

(73) Assignee: Huawei Device Co., Ltd., Dongguan (CN)

( * ) Notice: Subject to any disclaimer, the term of this patent is extended or adjusted under 35 U.S.C. 154(b) by 507 days.

(21) Appl. No.: 13/838,386

(22) Filed: Mar. 15, 2013

(65) Prior Publication Data
US 2013/0285948 A1     Oct. 31, 2013

(30) Foreign Application Priority Data

Apr. 28, 2012   (CN) .................. 201210132053.X

(51) Int. Cl.
*G06F 3/041*     (2006.01)
*G06F 3/048*     (2013.01)
(Continued)

(52) U.S. Cl.
CPC ............ *G06F 3/041* (2013.01); *G06F 3/0486* (2013.01); *G06F 3/04886* (2013.01); *G06F 9/451* (2018.02)

(58) Field of Classification Search
CPC ..... G06F 3/00; G06F 3/01; G06F 3/02; G06F 3/033; G06F 3/041; G06F 3/048;
(Continued)

(56) References Cited

U.S. PATENT DOCUMENTS 5,760,773 A * 6/1998 Berman ................ G06F 1/1626
345/672
6,353,452 B1   3/2002 Hamada et al.
(Continued)

FOREIGN PATENT DOCUMENTS

CN        1790240 A    6/2006
CN        1991750 A    7/2007
(Continued)

OTHER PUBLICATIONS

International Search Report issued in corresponding PCT Patent Application No. PCT/CN2012/086075, dated Mar. 28, 2013.
(Continued)

*Primary Examiner* — Chanh D Nguyen
*Assistant Examiner* — Nguyen H Truong
(74) *Attorney, Agent, or Firm* — Leydig, Voit & Mayer, Ltd.

(57)                ABSTRACT

The present invention provides a method for processing a touch screen terminal object and a touch screen terminal. The method includes: receiving an object placing instruction of placing, in a container interface, a source object selected in a source interface, determining, according to attribute information of the source object, a display icon that corresponds to the source object, and displaying, in the container interface, the display icon that corresponds to the source object; receiving an icon placing instruction of placing the display icon that corresponds to the source object and is in the container interface on a selected target object in a target interface; determining a target operation option according to the attribute information of the source object and attribute information of the target object; and starting a target operation procedure according to the target operation option and the target object.

14 Claims, 20 Drawing Sheets

(51) Int. Cl.
  *G06F 9/451* (2018.01)
  *G06F 3/0488* (2013.01)
  *G06F 3/0486* (2013.01)
(58) Field of Classification Search
  CPC ........ G06F 3/0488; G06F 17/20; G06F 15/16;
       G06F 3/0481; G06F 3/0482; G06F
       3/0484; G06F 3/0486; G09G 5/00
  See application file for complete search history.

(56) References Cited

U.S. PATENT DOCUMENTS

| | | |
|---|---|---|
| 2003/0007007 A1 | 1/2003 | Hinegardner et al. |
| 2003/0069931 A1* | 4/2003 | Omura .................. G06F 3/0481 709/205 |
| 2006/0015818 A1 | 1/2006 | Chaudhri et al. |
| 2006/0129945 A1 | 6/2006 | Dettinger et al. |
| 2007/0150834 A1 | 6/2007 | Muller et al. |
| 2007/0216938 A1 | 9/2007 | Tomita |
| 2009/0193351 A1* | 7/2009 | Lee ..................... G06F 3/04883 715/769 |
| 2009/0228820 A1 | 9/2009 | Kim et al. |
| 2009/0259959 A1 | 10/2009 | Grotjohn et al. |
| 2010/0060599 A1 | 3/2010 | Kwak et al. |
| 2011/0022982 A1 | 1/2011 | Takaoka et al. |
| 2011/0029921 A1* | 2/2011 | Terada ................ G06F 3/04886 715/810 |
| 2011/0035691 A1* | 2/2011 | Kim .................... G06F 3/04817 715/765 |
| 2011/0066976 A1 | 3/2011 | Hwang |
| 2011/0087981 A1* | 4/2011 | Jeong ................. G06F 3/04817 715/765 |
| 2011/0107226 A1* | 5/2011 | Heo .................. H04M 1/72561 715/736 |
| 2011/0126104 A1* | 5/2011 | Woods .................. G11B 27/32 715/719 |
| 2011/0286040 A1* | 11/2011 | Seto ........................ G06F 3/125 358/1.15 |
| 2011/0289427 A1* | 11/2011 | Toprani ................. G06F 3/0488 715/746 |
| 2012/0054657 A1* | 3/2012 | Nurmi ................... G06F 3/0481 715/769 |
| 2012/0084689 A1* | 4/2012 | Ledet .................... G06F 3/0486 715/769 |
| 2012/0110486 A1* | 5/2012 | Sirpal ..................... G06F 9/543 715/770 |
| 2012/0246594 A1* | 9/2012 | Han ..................... G06F 3/0486 715/790 |
| 2012/0289290 A1 | 11/2012 | Chae et al. |

FOREIGN PATENT DOCUMENTS

| | | |
|---|---|---|
| CN | 1997957 A | 7/2007 |
| CN | 101527745 A | 9/2009 |
| CN | 101673176 A | 3/2010 |
| CN | 102043580 A | 5/2011 |
| CN | 102681847 A | 9/2012 |
| EP | 2060970 A1 | 5/2009 |
| EP | 2284674 A2 | 2/2011 |
| JP | H11-143883 A | 5/1999 |
| JP | 2004-501456 A | 1/2004 |
| JP | 2007-249461 A | 9/2007 |
| JP | 2009-217815 A | 9/2009 |
| JP | 2012-530324 A | 11/2012 |
| KR | 10-2000-0074826 A | 12/2000 |
| KR | 10-2010-0123003 A | 11/2010 |
| KR | 10-2011-0029279 A | 3/2011 |
| KR | 10-2011-0063410 A | 6/2011 |
| WO | WO 01/99033 A2 | 12/2001 |
| WO | WO 2010/148030 A2 | 12/2010 |

OTHER PUBLICATIONS

Extended European Search Report issued in corresponding European Patent Application No. 13160806.9, dated Sep. 13, 2013, 6 pages.

* cited by examiner

METHOD FOR PROCESSING TOUCH SCREEN TERMINAL OBJECT AND TOUCH SCREEN TERMINAL

CROSS-REFERENCE TO RELATED APPLICATION

This application claims priority to Chinese Patent Application No. 201210132053.X, filed on Apr. 28, 2012, which is hereby incorporated by reference in its entirety.

FIELD OF THE INVENTION

The present invention relates to mobile communications technologies, and in particular, to a method for processing a touch screen terminal object and a touch screen terminal.

BACKGROUND OF THE INVENTION

As handheld terminal devices such as mobile phones, personal handphone systems, and personal digital assistants (Personal Digital Assistant, PDA) gradually become necessities for life of people, and people have increasing demands on functional aspects of handheld terminals. When using a touch screen terminal, a user always hopes to share contents such as an image or audio with others, for example, sends contents such as an image or audio to a friend or uploads the contents to a social network service (Social Network Service, SNS) website. To complete this sharing operation, the user always needs to undergo menu selection and interface switch for multiple times, so that this operation is complex and operation efficiency is relatively low.

SUMMARY OF THE INVENTION

The present invention provides a method for processing a touch screen terminal object and a touch screen terminal, so as to simplify an operation of processing an object and improve the efficiency of processing the object.

An embodiment of the present invention provides a method for processing a touch screen terminal object, where the method includes:

receiving an object placing instruction given by a user, where the object placing instruction is used to place, in a container interface, a source object selected by the user in a source interface, the object placing instruction carries attribute information of the source object, and the source interface is an interface where the source object is located;

determining, according to the attribute information of the source object, a display icon that corresponds to the source object, and displaying, in the container interface, the display icon that corresponds to the source object;

receiving an icon placing instruction given by the user, where the icon placing instruction is used to place the display icon that corresponds to the source object and is in the container interface on a target object in a target interface, the icon placing instruction carries the attribute information of the source object and attribute information of the target object, and the target interface is an interface where the target object is located;

determining a target operation option according to the attribute information of the source object and the attribute information of the target object, where the target operation option is an operation option of an executable operation that is generated when the source object is associated with the target object; and starting a target operation procedure according to the target operation option and the target object.

An embodiment of the present invention provides a touch screen terminal, including:

a first instruction receiving module, configured to receive an object placing instruction given by a user, where the object placing instruction is used to place, in a container interface, a source object selected by the user in a source interface, the object placing instruction carries attribute information of the source object, and the source interface is an interface where the source object is located;

a first obtaining module, configured to determine, according to the attribute information of the source object, a display icon that corresponds to the source object, and display, in the container interface, the display icon that corresponds to the source object;

a second instruction receiving module, configured to receive an icon placing instruction given by the user, where the icon placing instruction is used to place the display icon that corresponds to the source object and is in the container interface on a target object in a target interface, the icon placing instruction carries the attribute information of the source object and attribute information of the target object, and the target interface is an interface where the target object is located;

a second obtaining module, configured to determine a target operation option according to the attribute information of the source object and the attribute information of the target object, where the target operation option is an operation option of an executable operation that is generated when the source object is associated with the target object; and a processing module, configured to start a target operation procedure according to the target operation option and the target object.

With the method for processing a touch screen terminal object and the touch screen terminal provided in the embodiments of the present invention, a user may directly place, by setting a container interface, an object to be processed in the container interface; a touch screen terminal displays, according to a placing operation of the user, in the container interface, a display icon that corresponds to the object to be processed; the user may directly place the display icon in the container interface on a target object, so that the touch screen terminal provides, according to the placing operation of the user, an operation option of an executable operation that may be generated when the object to be processed is placed on the target object; and the user selects a target operation option, so as to complete processing of the object to be processed, when compared with the prior art, which simplifies an operation that the user processes an object in the touch screen terminal to a certain degree and improves the efficiency that the user processes the object in the touch screen terminal.

BRIEF DESCRIPTION OF THE DRAWINGS

To describe the technical solutions in the embodiments of the present invention or in the prior art more clearly, the accompanying drawings required for describing the embodiments are briefly introduced in the following. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

To make the objectives, technical solutions, and advantages of the embodiments of the present invention more comprehensible, the technical solutions in the embodiments of the present invention are clearly described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
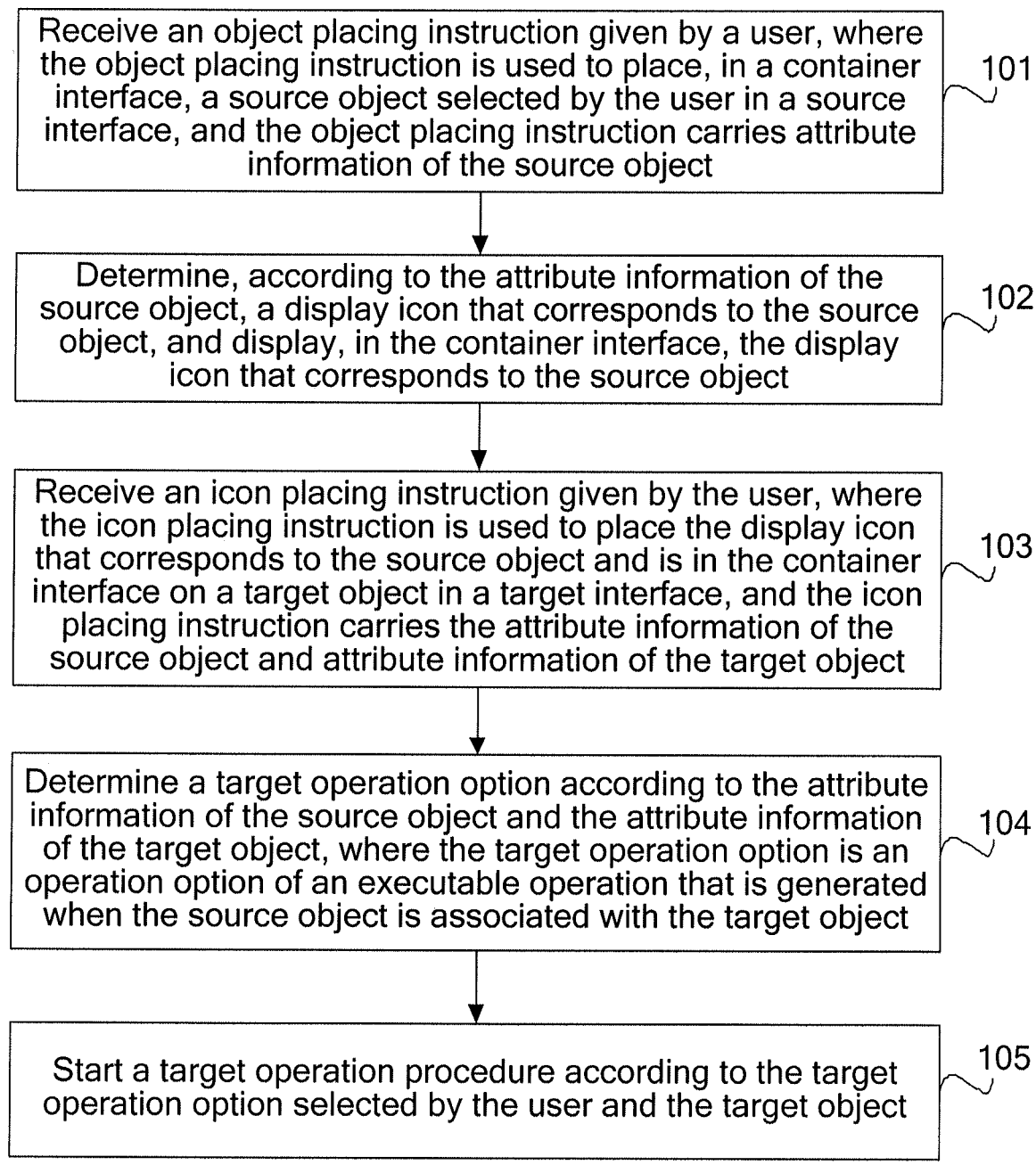
FIG. 1 is a flowchart of a method for processing a touch screen terminal object according to an embodiment of the present invention.

FIG. 1 is a flowchart of a method for processing a touch screen terminal object according to an embodiment of the present invention. As shown in FIG. 1, the method in this embodiment includes:

Step 101: Receive an object placing instruction given by a user, where the object placing instruction is used to place, in a container interface, a source object selected by the user in a source interface, and the object placing instruction carries attribute information of the source object.

The source interface is an interface where the source object is located, that is, an interface that is currently operated by the user.

The container interface is a display area on a display screen of a touch screen terminal, for example, the container interface may be a part of the display area on the display screen, where the size and position of the display area may vary with different display screens of touch screen terminals; and definitely, the container interface may also be the whole display area on the display screen.

Optionally, by taking consideration that application programs that are currently opened by the touch screen terminal, that is, opened interfaces, are displayed in a layer sequence, the container interface in this embodiment may be displayed on top, that is, the container interface in this embodiment may be an interface displayed on top on the display screen. That is, when the container interface is in a display state, the container interface is placed at the top of all interfaces, in this way, even though the user performs switching between different interfaces, the container interface can also be seen by the user, and it is convenient for the user to operate.

Optionally, the container interface in this embodiment may also be located on an interface that is currently displayed on the display screen, that is, a part of an area on the interface that is currently displayed on the display screen may be used as the container interface in this embodiment.

Optionally, in this embodiment, the user is allowed to perform an invoking operation on the container interface, that is, after the user gives an instruction of invoking the container interface, the container interface switches from a hidden state into a display state.

Optionally, in this embodiment, the user is further allowed to perform a close operation on the container interface, that is, after the user gives an instruction of closing the container interface, the container interface switches from a display state into a hidden state.

When the user needs to process a source object in a source interface, the user may place the source object in a container interface by giving an object placing instruction to a touch screen terminal. The object placing instruction given by the user carries attribute information of the source object.

For the user, an operation that the user gives the object placing instruction may be: placing, by the user, the source object in the source interface of the touch screen terminal through a specific gesture, for example, pressing and holding the source object and then dragging and dropping the source object into the container interface and then releasing the source object. In addition to placing the source object in the container interface in a dragging and dropping manner, the source object may be also placed in the container interface in other manners such as clicking or double clicking the source object and the container interface. For the touch screen terminal, an operation of receiving the object placing instruction given by the user may be: identifying a second gesture (for example, pressing and holding, dragging and releasing, or clicking or double clicking) according to a preset gesture-instruction mapping table, obtaining an object placing instruction that corresponds to the second gesture, and at the same time, obtaining attribute information of an object (that is, the source object) that is relevant to the gesture. The second gesture is a gesture that the user performs an operation on the source object on the display screen of the touch screen terminal.

The gesture-instruction mapping table is preconfigured in the touch screen terminal, and a content of the gesture-instruction mapping table may vary with different touch screen operations supported by different touch screen terminals. In this embodiment, the gesture-instruction mapping table mainly includes, but is not limited to, a mapping between a gesture of invoking a container interface and a container interface invoking instruction, a mapping between a gesture of closing a container interface and an instruction of closing the container interface, a mapping between a gesture of placing a source object in a container interface and an object placing instruction, and a mapping between a gesture of placing a display icon in a container interface on a target object and an icon placing instruction. For example, the gesture-instruction mapping table may further include mappings between gestures of operations of a user, such as opening a folder, an application program, and video and music, and opening instructions.

It should be noted that, in addition to using a specific gesture to perform the operation of giving the object placing instruction, the user may also give the object placing instruction through a function button or a menu on an interface, and so on, and any manner that is capable of bearing an instruction function is available.

The attribute information of the source object may include, but is not limited to, at least one piece of the following information: a type of the source object, a name of the source object, an image, such as a thumbnail image of the source object music, a video, an application program, text information, a contact, or a memorandum. For example, if the source object is a file, the type of the source object is a file type, the name of the source object is the file name of the file, and the thumbnail image of the source object may be a text icon used by the touch screen terminal. If the source object is music, the type of the source object is audio, the name of the source object is the name of the audio, and the thumbnail image of the source object may be a cover image of a music album to which the audio belongs, where the cover image is used by the touch screen terminal, or may be a music icon used by the touch screen terminal. If the source object is an image, the type of the source object is the image, the name of the source object is the name of the image, and the thumbnail image of the source object may be a thumbnail image of the image, where the thumbnail image is used by the touch screen terminal.

Optionally, the touch screen terminal may identify the type of the source object through a name suffix of the source object. For example, if the touch screen terminal identifies that the name suffix of the source object is .txt, the source object is text information; if the touch screen terminal identifies that the name suffix of the source object is .rm, .avi, and so on, the source object is audio information; and if touch screen terminal identifies that the name suffix of the source object is .jpg, the source object is image information.

Step 102: Determine, according to the attribute information of the source object, a display icon that corresponds to the source object, and display, in the container interface, the display icon that corresponds to the source object.

An optional implementation manner of step 102 is: searching, by the touch screen terminal, a preset object attribute database according to the attribute information of the source object, obtaining a display icon that corresponds to the source object, and displaying, in the container interface, the display icon that corresponds to the source object.

The object attribute database is preset in the touch screen terminal. The object attribute database includes attribute information of each object in the touch screen terminal and icon information that corresponds to each object.

It should be noted that, attribute information of an object, which is included in the object attribute database, includes, but is not limited to, at least one piece of the following information: a type, a name, and a thumbnail image of each object.

For an object that has no thumbnail image, the object attribute database may not include a thumbnail image of the object. For an object that has a thumbnail image, the object attribute database may include a thumbnail image of the object, and icon information that corresponds to the object and is stored in the object attribute database may be, but is not limited to, the thumbnail image of the object. In other words, for the object that has a thumbnail image, the icon information that corresponds to the object and is stored in the object attribute database may be the thumbnail image of the object, and may also be another icon that is different from the thumbnail image of the object.

Specifically, after receiving the object placing instruction given by the user, the touch screen terminal searches the preset object attribute database according to the attribute information of the source object, where the attribute information of the source object is carried in the object placing instruction, that is, matches the attribute information of the source object with attribute information of each object, where the attribute information of each object is stored in the object attribute database; and when the attribute information of the source object is matched with attribute information of a certain object in the object attribute database, obtains icon information that corresponds to a matched object (that is, the source object), and then obtains, according to the icon information, a display icon that corresponds to the source object. Then, the touch screen terminal places the obtained display icon in the container interface, that is, displays the obtained display icon in the container interface. The touch screen terminal may directly use the icon information that is obtained and corresponds to the source object as the display icon that corresponds to the source object. In addition, if the attribute information of the source object includes a thumbnail image of the source object and the thumbnail image of the source object is different from the icon information that corresponds to the source object, the touch screen terminal may further combine the icon information that is obtained and corresponds to the source object with the thumbnail image of the source object, so as to obtain the display icon that corresponds to the source object.

Step 103: Receive an icon placing instruction given by the user, where the icon placing instruction is used to place the display icon that corresponds to the source object and is in the container interface on a target object in a target interface, and the icon placing instruction carries the attribute information of the source object and attribute information of the target object.

The target interface is an interface where the target object is located, that is, an interface that is currently operated by the user.

Further, the interface where the source object is located and the interface where the target object is located may be the same interface, and may also be different interfaces. If the interface where the source object is located is different from the interface where the target object is located, the user needs to perform switching between the two interfaces.

After the user sees, from the container interface, the display icon that corresponds to the source object, the user may give an icon placing instruction to the touch screen terminal, so as to place, on the target object, the display icon that corresponds to the source object. An operation that the user gives the icon placing instruction may be: dragging and dropping, by the user, through a specific gesture, the display icon that corresponds to the source object onto the target object in the target interface from the container interface. The user may select the target object in a dragging and dropping process. For example, the user may press and hold the display icon that corresponds to the source object, then drag and drop the display icon onto the target object in the target interface, and then release the display icon. The releasing action is equivalent to giving the icon placing instruction to the touch screen terminal, and at the same time, the target object is determined. In addition, the user may also select a target object in the target interface in advance, and then place the display icon that corresponds to the source object on the selected target object in a manner such as dragging and dropping. A manner for selecting the target object may be a manner such as clicking or double clicking the target object. For the touch screen terminal, receiving the icon placing instruction given by the user may be: identifying a third gesture according to the preset gesture-instruction mapping table, obtaining an icon placing instruction that corresponds to the third gesture, and at the same time, obtaining attribute information of objects (that is, the source object and the target object) that are relevant to the icon placing instruction. The third gesture is a gesture that the user performs an operation on the target object and the display icon that corresponds to the source object on the display screen of the touch screen terminal.

It should be noted that, in addition to using a specific gesture to perform the operation of giving the icon placing instruction, the user may also give the icon placing instruction through a function button or a menu on an interface, and so on, and any manner that is capable of bearing an instruction function is available.

The target object may be a folder, an image, a contact, or a desktop, where the folder may be, but is not limited to, an image folder, a music folder, a video folder, and so on.

The attribute information of the target object may include at least one of: a type of the target object and a name of the target object. For example, if the target object is an image folder, the type of the target object is a folder type, and the name of the target object may be the name of the image folder; if the target object is a music folder, the type of the target object is a folder type, and the name of the target object may be the name of the music folder; and if the target object is a contact, the type of the target object is a contact type, and the name of the target object may be the name of the contact.

Step 104: Determine a target operation option according to the attribute information of the source object and the attribute information of the target object, where the target operation option is an operation option of an executable operation that is generated when the source object is associated with the target object.

An optional implementation manner of step 104 is: searching, by the touch screen terminal, a preset object operation database according to the attribute information of the source object and the attribute information of the target object, and obtaining a target operation option.

The object operation database is preset in the touch screen terminal. A content of the object operation database may vary with different objects on different touch screen terminals and supported operations. The object operation database mainly includes operation options of executable operations that are generated when objects in the touch screen terminal are associated with each other. In addition, the object operation database may further include attribute information of each object in the touch screen terminal.

Optionally, for the convenience of understanding this solution, the object operation database is described in a manner of a two-dimensional list. For example, a first horizontal column of the list represents objects on the touch screen terminal, and a first vertical column also represents objects on the touch screen terminal, and the middle part represents operation options of executable operations that are generated when any two objects are associated with each other. In addition, the objects on the touch screen terminal and the operation options of executable operations that are generated when the objects are associated with each other may also be implemented in manner of a configuration file.

Further, one kind of implementation process of the foregoing optional implementation manner includes:

First, after receiving the icon placing instruction given by the user, the touch screen terminal searches the object operation database according to the attribute information of the source object and the attribute information of the target object in the icon placing instruction, and obtains and displays an operation list of the source object. Specifically, the touch screen terminal separately matches the attribute information of the source object and the attribute information of the target object with attribute information of each object, where the attribute information of each object is stored in the object operation database; and when the attribute information of the source object and the target object are separately matched with attribute information of a certain object in the object operation database, generates an operation list of the source list according to operation options of executable operations that correspond to two matched objects in the object operation database, and displays the operation list of the source object for the user to select. The operation list of the source object includes at least one operation option of the executable operation that is generated when the source object is associated with the target object.

For example, if the source object is an image and the target object is a contact, an operation option of an executable operation that is generated when the source object is associated with the target object may be an operation option such as sending the source object to the target object and setting a portrait icon of the target object according to the source object. An operation option of sending the source object to the target object may be: an operation option such as sending the source object to the target object through a short message, sending the source object to the target object through an email, sending the source object to the target object through Bluetooth, and/or sending the source object to the target object through Wi-Fi, and the operation option of sending the source object to the target object may be directly displaying various sending options, or may be displaying the various sending options in layers, that is, displaying "sending the source object to the target object" and displaying various sending options in a next layer.

If the source object is an image and the target object is a folder, an operation option of an executable operation that is generated when the source object is associated with the target object may be: an operation option of adding the source object into the target object, that is, adding the image into the folder, and an operation option of setting a cover of the target object according to the source object.

If the source object is an image and the target object is a desktop, the operation list of the source object includes operation options of creating a photo frame widget of the source object on the target object and setting the source object to a wallpaper of the target object.

If the source object is a text and the target object is an image or a folder, an operation option of an executable operation that is generated when the source object is associated with the target object may be: an operation option of adding a label (mark or tag), that is, adding remark information for the image. A content of the remark information is the source object. A process of completing the operation may be: selecting, by the user, a line of words in the source interface, and using the line of words as the source object, and dragging the source object into the container interface, so as to form a corresponding text object icon. The text object icon may be dragged and dropped onto a certain target image or a certain folder, so that an operation list pops up, and an operation option of "adding a label" is displayed in the operation list, and then the user selects the operation option of "adding a label", so as to directly complete this task. In addition, an operation option of setting a name of the target object according to the source object may further be included, and a process of completing the operation may be: selecting, by the user, a line of words in the source interface, using the line of words as the source object, and dragging the source object into the container interface, so as to form a corresponding text object icon. The text object icon may be dragged and dropped onto a certain target image or a certain folder, so that an operation list pops up, and an operation option of "setting a name" is displayed in the operation list, and then the user selects the operation option of "setting a name", so as to directly complete the task.

If the source object is audio and the target object is a contact, the operation list of the source object includes: an operation option of sending the source object to the target object and an operation option of setting the source object to a tone of the target object.

Then, the touch screen terminal receives an operation selection instruction given by the user, and obtains a target operation option from the operation selection instruction. The operation selection instruction includes a target operation option selected by the user from the operation list of the source object.

After the touch screen terminal displays the operation option of the executable operation that is generated when the source object is associated with the target object, the user may give the operation selection instruction to the touch screen terminal, that is, notify the touch screen terminal which operation is selected.

An operation that the user gives the operation selection instruction to the touch screen terminal may be: selecting, by the user, through a specific gesture, a required operation option from at least one displayed operation option of an executable operation as a target operation option. For example, the user may give the operation selection instruction to the touch screen terminal in a manner such as clicking a required operation option or double clicking a required operation option or tapping and holding a required operation option. For the touch screen terminal, receiving the operation selection instruction given by the user may be: identifying a first gesture according to the preset gesture-instruction mapping table, and obtaining an operation selection instruction that corresponds to the first gesture. The first gesture is a gesture (for example, which may be clicking, double clicking, or tapping and holding) that the user performs an operation on the operation list of the source object on the display screen of the touch screen terminal.

Optionally, for a case that only one executable operation can be obtained when the source object is associated with the target object, the touch screen terminal may not generate and not display an operation list of the source object, but directly give a target operation option.

It should be noted that, for a case that no executable operation exist when the source object is associated with the target object, the touch screen terminal may not perform any operation. This case belongs to a special case, which is not described in detail in the embodiments of the present invention.

Step 105: Start a target operation procedure according to the target operation option selected by the user and the target object.

After the touch screen terminal identifies, according to the operation selection instruction given by the user, the target operation option selected by the user, the touch screen terminal starts the target operation procedure according to the target operation option selected by the user and the target object.

The target operation procedure is relevant to a type of the source object, a type of the target object, and a selected specific operation option.

For example, if the source object is an image, the target object is a contact, and the target operation option is an operation option of "sending", the target operation procedure is that the touch screen terminal sends the source object to the target object, that is, sends the image to the contact. Further, if the target operation option is an operation option of "sending through Bluetooth", the touch screen terminal sends the image to the contact through Bluetooth.

If the source object is an image, the target object is an image folder, and the target operation option is an operation option of "adding", the target operation procedure is that the touch screen terminal adds the image into the image folder.

Optionally, when an operation list only has one operation option, the operation option list may not pop up for the user to select, but the operation option is directly used as the target operation option and the target operation procedure is directly started. In this way, an operation of the user is reduced to a certain degree and the efficiency of processing an object in the touch screen terminal is improved.

In this embodiment, a touch screen terminal generates an object placing instruction by providing a container interface and allowing a user to directly place an object to be processed in the container interface; the touch screen terminal obtains, according to the object placing instruction, a display icon that corresponds to the object to be processed and display the display icon in the container interface, and generates an icon placing instruction by allowing the user to directly place the display icon in the container interface on a target object; and the touch screen terminal displays, according to the icon placing instruction, an executable operation in a manner of an operation option to the user, where the executable operation is generated when the object to be processed is associated with the target object, and then starts a corresponding processing procedure according to a target operation option selected by the user and the target object, thereby reducing the number of times of performing menu selection and interface switch when the user processes the object to be processed, simplifying a process that the user processes an object in the touch screen terminal, and improving the efficiency of processing the object in the touch screen terminal.

Figure 2:
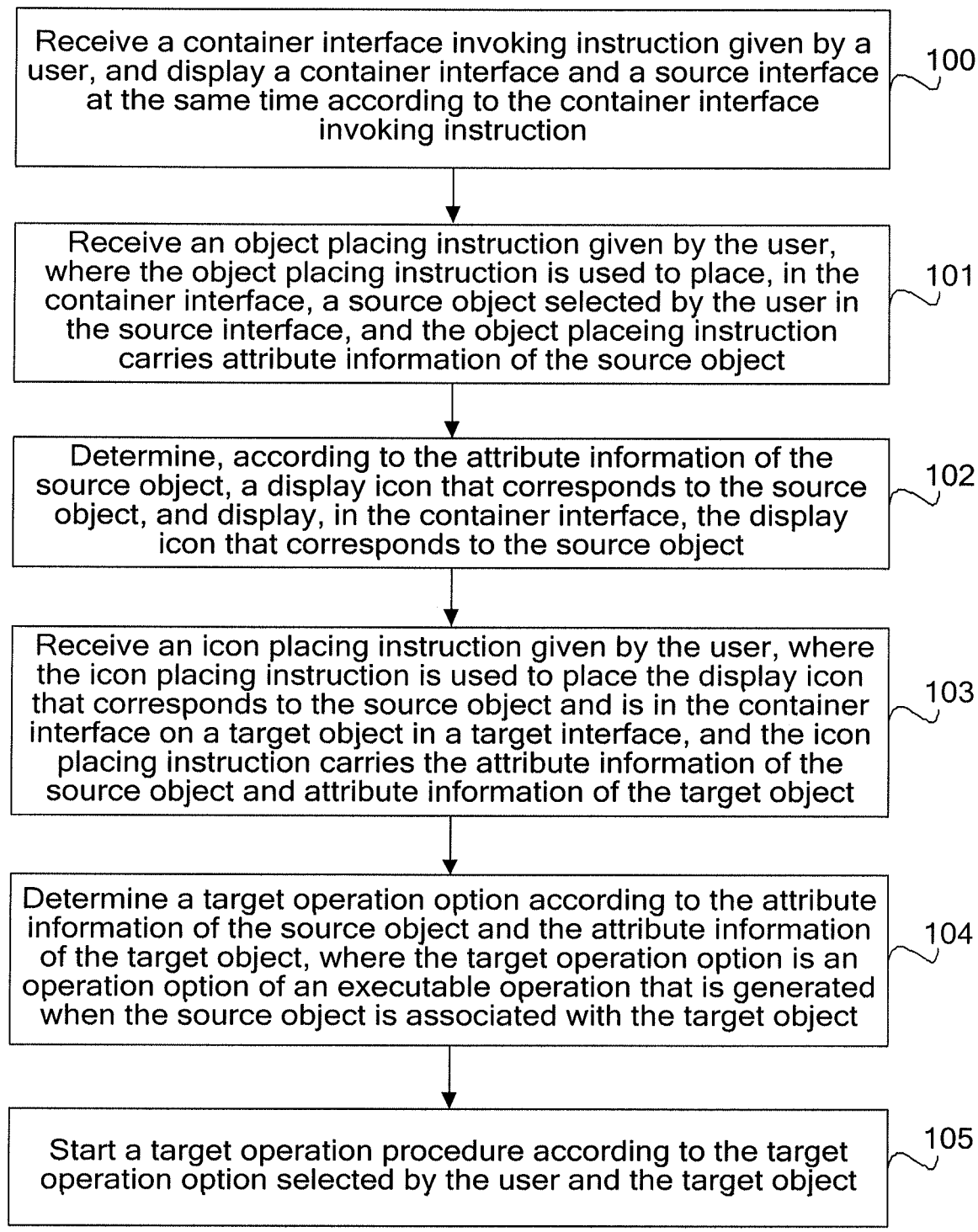
FIG. 2 is a flowchart of a method for processing a touch screen terminal object according to another embodiment of the present invention.

FIG. 2 is a flowchart of a method for processing a touch screen terminal object according to another embodiment of the present invention. The method in this embodiment may be implemented on the basis of the embodiment shown in FIG. 1. As shown in FIG. 2, before step 101, the method in this embodiment includes:

Step 100: Receive a container interface invoking instruction given by a user, and display a container interface and a source interface at the same time according to the container interface invoking instruction.

When a container interface is in a hidden state, a user may invoke the container interface by giving a container interface invoking instruction to a touch screen terminal, so as to enable the container interface to be in a display state.

For the user, the user gives the container interface invoking instruction to the touch screen terminal, which may be: performing an operation, by the user, on a display screen of the touch screen terminal through a specific gesture. For example, the user may give the container interface invoking instruction to the touch screen terminal by sliding from one end of the display screen to the other end, or by writing words such as "invoking the container interface" on the display screen, or by clicking or double clicking the display screen at a certain frequency; or may also give the container interface invoking instruction to the touch screen terminal by dragging a source object to a position where the container interface is located, so as to enable the container interface to pop up. Optionally, after the container interface pops up when being invoked, and after an operation on the container interface is ended, the container interface may further automatically disappear, which is similar to hiding and appearance of a currently common instant messaging tool (such as QQ). For the touch screen terminal, an operation of receiving the container interface invoking instruction given by the user may be: identifying, by the touch screen terminal, according to a preset gesture-instruction mapping table, a gesture that the user performs an operation on the display screen of the touch screen terminal, and obtaining a container interface invoking instruction that corresponds to the gesture.

It should be noted that, in addition to using a specific gesture to perform the operation of giving the container interface invoking instruction, the user may also give the container interface invoking instruction through a function button or a menu on an interface, and so on, and any manner that is capable of bearing an instruction function is available. For example, the user may also invoke the container interface in a voice manner or through a gesture (this manner is generally referred to as body sensing) that is not directly touching the display screen.

After the touch screen terminal obtains the container interface invoking instruction, the container interface is displayed on the display screen. In order to place a source object in the container interface according to an object placing instruction given by the user, the container interface invoking instruction in this embodiment may enable the container interface and the source interface to be displayed at the same time.

The touch screen terminal may create a container interface by adding an interface, dividing a current interface, and so on. If the touch screen terminal creates the container interface by adding an interface, an implementation manner that the touch screen terminal creates the container interface may be: After the container interface invoking instruction is received, an interface may be temporarily generated, and a display area of the interface may be set, and then the interface is displayed on top. In this implementation manner, the container interface is another interface that is displayed on top and is independent of the source interface. If the touch screen terminal creates the container interface by dividing a current interface, an implementation manner that the touch screen terminal creates the container interface may be: After the container interface invoking instruction is received, the current interface is divided, and a part of a display area obtained through division is used as the container interface; or reduction processing is performed on the current interface as a whole, and an empty part of the display area is used as the container interface; and in addition, with switching of the current interface, the touch screen terminal needs to divide the current interface in real time, and uses a part as the container interface, and further needs to move a corresponding display icon in the container interface to a container interface on an interface which is newly switched to. In this implementation manner, the container interface is located in a part of the display area on the source interface.

In this embodiment, a user can invoke a hidden container interface by giving a container interface invoking instruction to a touch screen terminal, so that an operation of invoking the container interface is easy and can be implemented easily.

Figure 3:
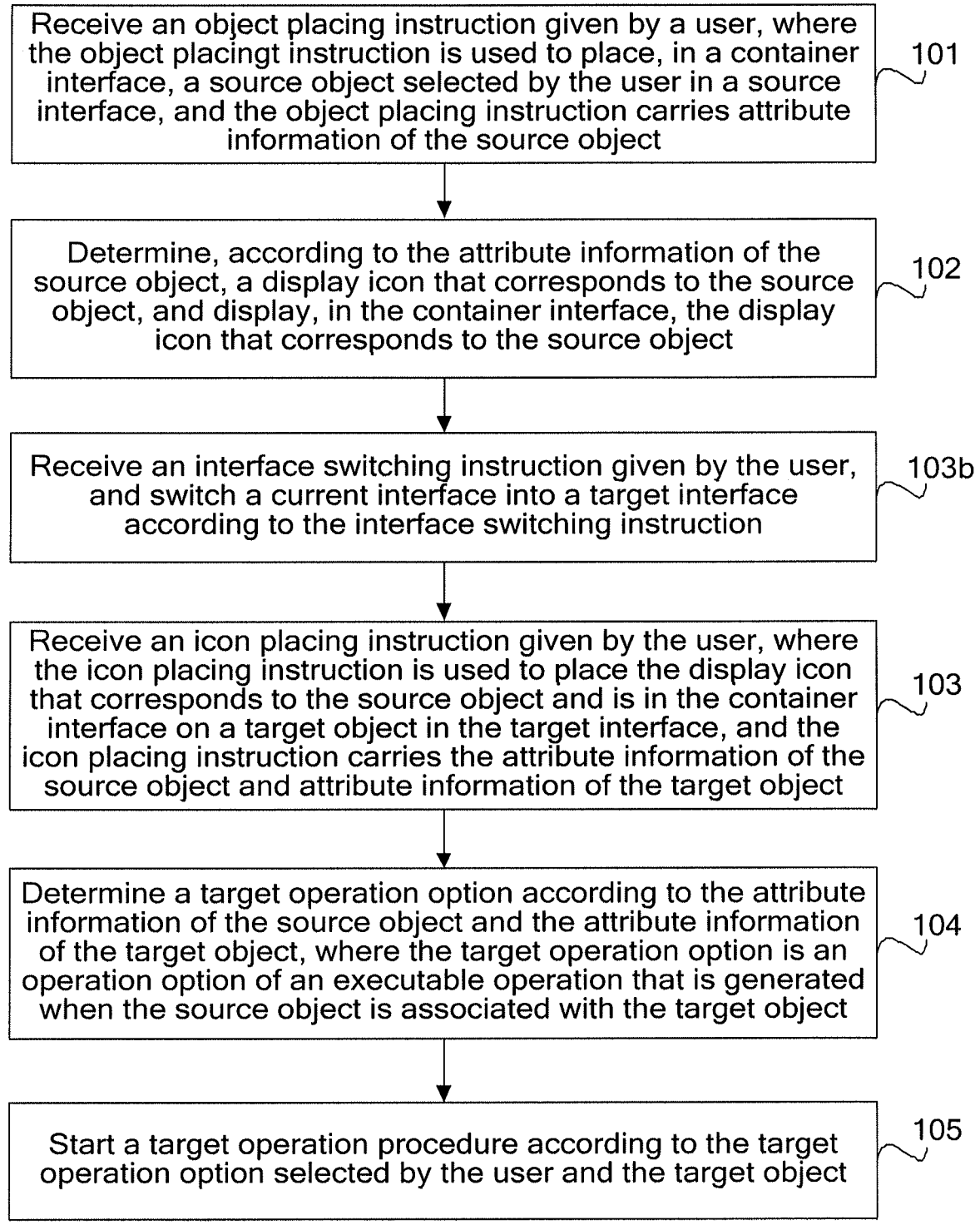
FIG. 3 is a flowchart of a method for processing a touch screen terminal object according to another embodiment of the present invention.

FIG. 3 is a flowchart of a method for processing a touch screen terminal object according to another embodiment of the present invention. This embodiment may be implemented on the basis of the embodiment shown in FIG. 1. As shown in FIG. 3, before step 103, the method in this embodiment includes:

Step 103*b*: Receive an interface switching instruction given by a user, and switch a current interface to a target interface according to the interface switching instruction.

In this embodiment, a source interface and a target interface are different. Therefore, the user implements switching between interfaces by giving an interface switching instruction to a touch screen terminal.

An operation that the user gives the interface switching instruction to the touch screen terminal may be: performing an operation, by the user, on the source interface or the target interface through a specific gesture. For example, the user may perform an operation, such as double clicking or clicking, on the target interface, so as to switch the target interface to the current interface. For another example, the user may perform an operation on the source interface through a specific gesture, and place the source interface at a next layer, and sequentially perform an operation of placing other interfaces above the target interface at a next layer until the target interface is placed on the top layer above other interfaces except the container interface. For the touch screen terminal, an operation of receiving the interface switching instruction given by the user may be: identifying, according to a preset gesture-instruction mapping table, a gesture that the user performs an operation on a display screen of the touch screen terminal, and obtaining an interface switching instruction that corresponds to the gesture, so as to complete interface switching.

It should be noted that, in addition to using a specific gesture to perform the operation of giving the interface switching instruction, the user may also give the interface switching instruction through a function button or a menu on an interface, and so on, and any manner that is capable of bearing an instruction function is available.

In this embodiment, a user is allowed to give an interface switching instruction, so as to implement switching between different interfaces, which is beneficial to processing on different objects in different interfaces and satisfies a practical application requirement.

Figure 4:
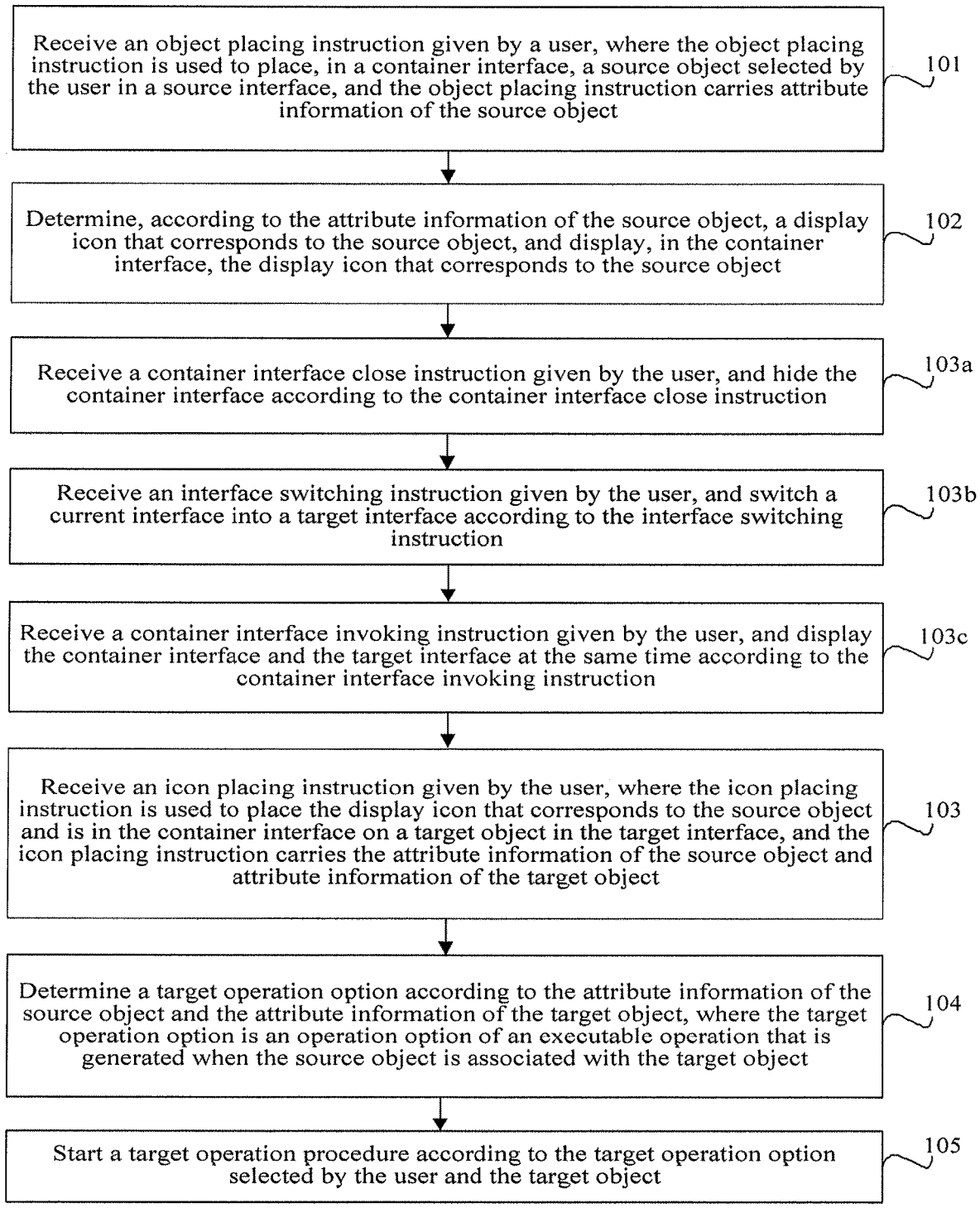
FIG. 4 is a flowchart of a method for processing a touch screen terminal object according to another embodiment of the present invention.

FIG. 4 is a flowchart of a method for processing a touch screen terminal object according to another embodiment of the present invention. This embodiment is implemented on the basis of the embodiment shown in FIG. 3. As shown in FIG. 4, before step 103*b*, the method in this embodiment includes:

Step 103*a*: Receive a container interface closing instruction given by a user, and hide a container interface according to the container interface closing instruction.

In this embodiment, a user is allowed to hide and invoke a container interface. When the user does not need the container interface, the user may give a container interface closing instruction to a touch screen terminal to close the container interface, that is, hide the container interface.

An operation that the user gives the container interface closing instruction to the touch screen terminal may be: performing an operation, by the user, on a display screen of the touch screen terminal through a specific gesture. For example, the user may give the container interface closing instruction to the touch screen terminal by sliding downward. For the touch screen terminal, an operation of receiving the container interface closing instruction given by the user may be: identifying, according to a preset gesture-instruction mapping table, a gesture that the user performs an operation on the display screen of the touch screen terminal, and obtaining a container interface closing instruction that corresponds to the gesture.

It should be noted that, in addition to using a specific gesture to perform the operation of giving the container interface closing instruction, the user may also give the container interface closing instruction through a function button or a menu on an interface, and so on, and any manner that is capable of bearing an instruction function is available.

In this embodiment, after the touch screen terminal places, in the container interface, a display icon that corresponds to a source object, the user needs to select a target object in a target interface, and at this time, the container interface may not be displayed, and the user gives a container interface closing instruction, so that the touch screen terminal hides the container interface. In this way, a display area of the target interface may become bigger and may be displayed more clearly.

Further, as shown in FIG. 4, after step 103b, the method in this embodiment further includes:

Step 103c: Receive a container interface invoking instruction given by the user, and display the container interface and the target interface at the same time according to the container interface invoking instruction.

Because the container interface is closed, the container interface needs to be invoked again when the source interface is switched to the target interface. In order to place, on a target object in the target interface according to an icon placing instruction given by the user, the display icon that corresponds to the source object, the container interface invoking instruction in this embodiment may enable the container interface and the target interface to be displayed at the same time, and it is convenient to perform the foregoing placing operation.

Reference may be made to the description of step 100 in the embodiment shown in FIG. 2 for other descriptions of step 103c, which is not described herein again.

In this embodiment, by closing and invoking a container interface, it is beneficial to improving the utilization efficiency of a display screen.

Figure 5:
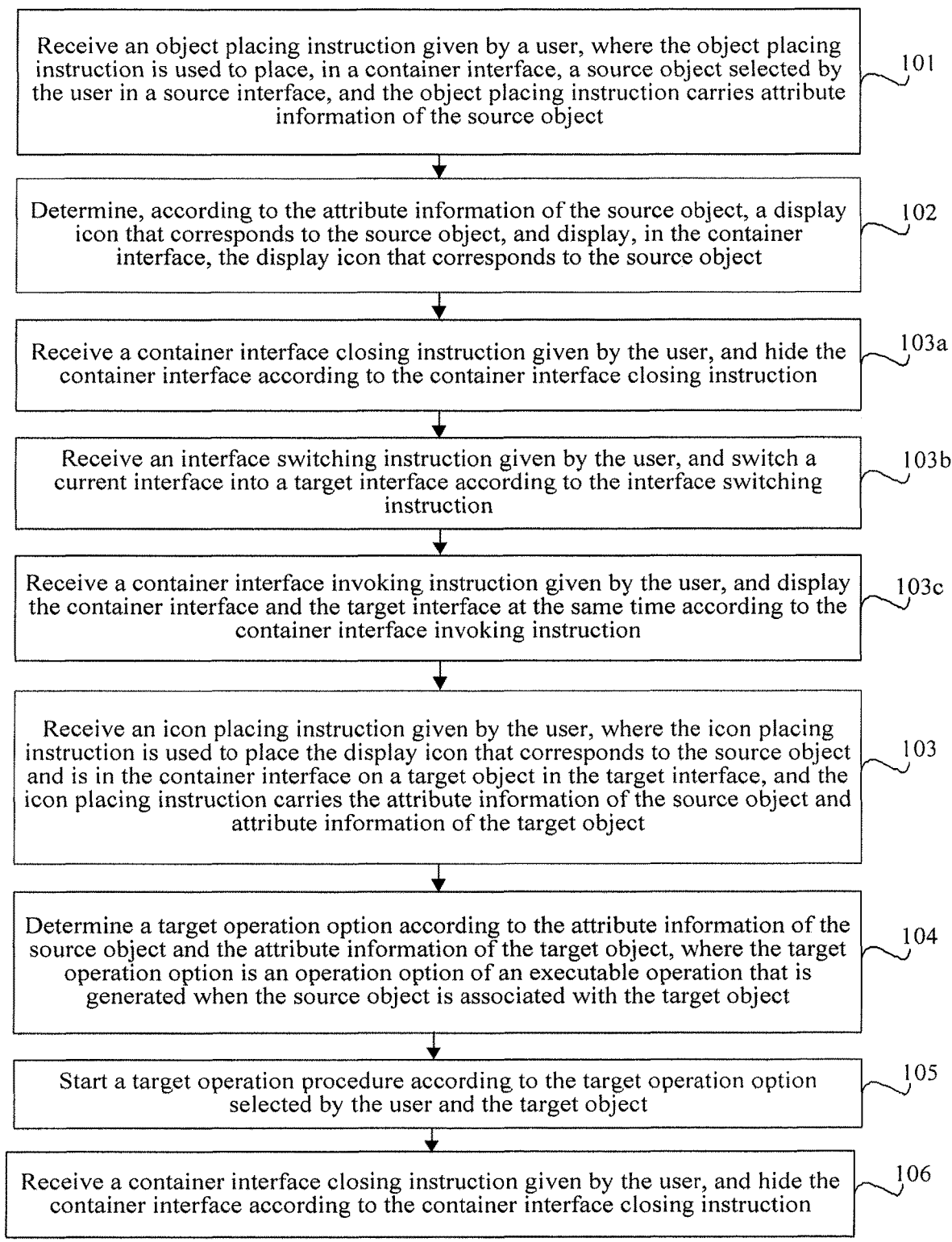
FIG. 5 is a flowchart of a method for processing a touch screen terminal object according to another embodiment of the present invention.

FIG. 5 is a flowchart of a method for processing a touch screen terminal object according to another embodiment of the present invention. The method in this embodiment may be implemented on the basis of any one of the embodiments shown in FIG. 1 to FIG. 4. Implementing this embodiment on the basis of the embodiment shown in FIG. 4 is taken as an example. As shown in FIG. 5, after step 105, the method in this embodiment further includes:

Step 106: Receive a container interface closing instruction given by a user, and hide a container interface according to the container interface closing instruction.

Reference may be made to the description of step 103a in the embodiment shown in FIG. 4 for step 106, which is not described herein again.

In this embodiment, after the user completes a target operation procedure, the container interface may be closed, which is beneficial to saving a display resource of a display screen and is beneficial to improving a utilization ratio of the display screen.

It should be noted that, the user may perform step 106 after completing a target operation procedure once. In addition, the user may also perform step 106 after completing the target operation procedure for multiple times, that is to say, the user may return to a target interface and continue to select a next target operation option after completing the target operation procedure once, so as to start a next target operation procedure and then complete the target operation procedure for multiple times, and then perform step 106.

Figure 6:
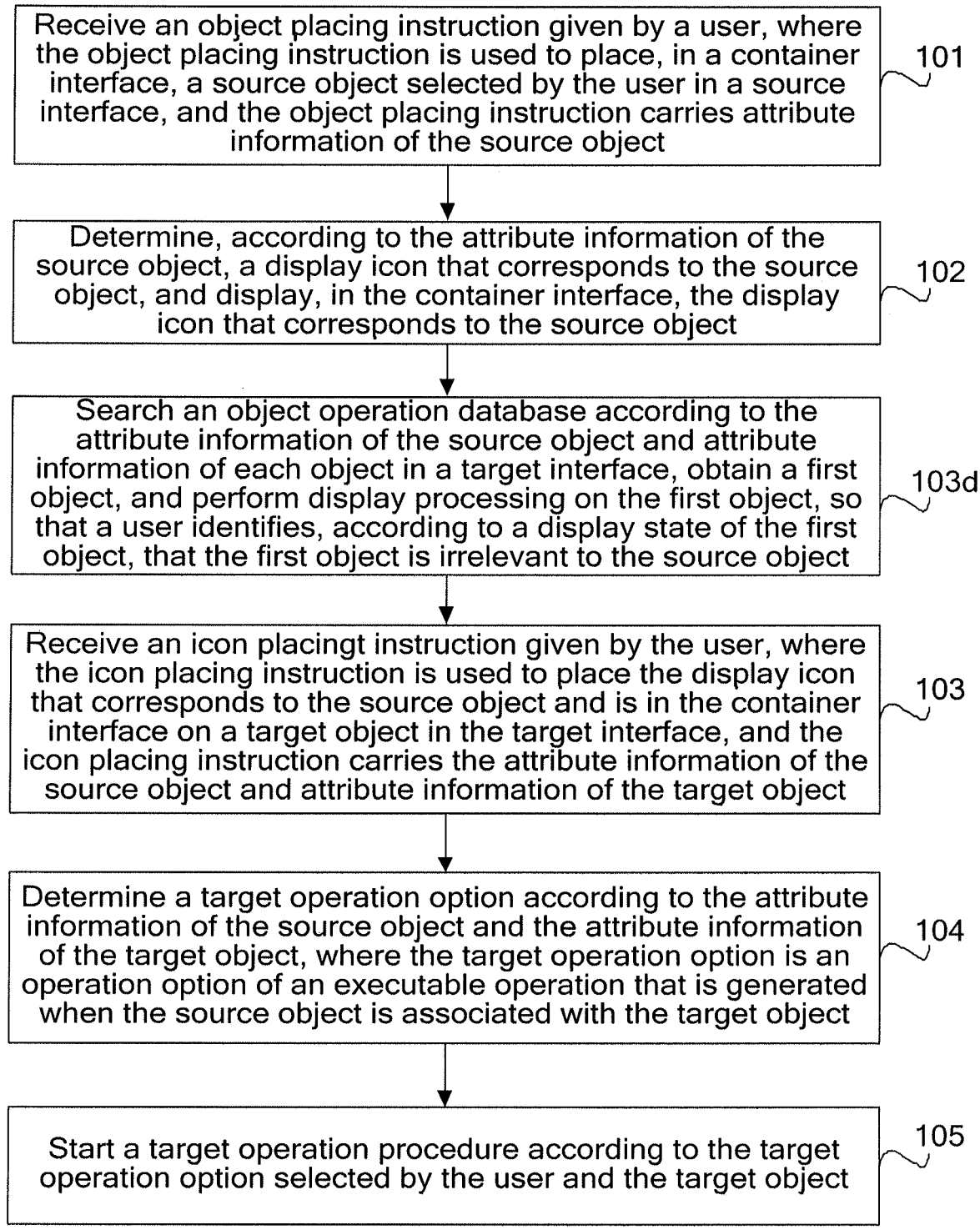
FIG. 6 is a flowchart of a method for processing a touch screen terminal object according to another embodiment of the present invention.

FIG. 6 is a flowchart of a method for processing a touch screen terminal object according to another embodiment of the present invention. This embodiment may be implemented on the basis of any one of the embodiments shown in FIG. 1 to FIG. 5. Implementing this embodiment on the basis of the embodiment shown in FIG. 1 is taken as an example. As shown in FIG. 6, before step 103, the method in this embodiment includes:

Step 103d: Search an object operation database according to attribute information of a source object and attribute information of each object in a target interface, obtain a first object, and perform display processing on the first object, so that a user identifies, according to a display state of the first object, that the first object is irrelevant to the source object.

The first object is an object whose executable operation generated when the source object is associated with the first object is empty.

Specifically, after obtaining the attribute information of the source object and before receiving an icon placing instruction given by the user, a touch screen terminal searches the object operation database according to the attribute information of the source object and the attribute information of each object in the target interface, that is, separately matches the attribute information of the source object and the attribute information of each object in the target interface with attribute information of each object, where the attribute information of each object is stored in the object operation database; and if the attribute information of the source object and attribute information of one object in the target interface are separately matched with attribute information of an object in the object operation database, and executable operations that correspond to two matched objects in the object operation database are empty, it is indicated that the source object is irrelevant to the object in the target interface, and the object in the target interface is used as the first object. Because the executable operation generated when the first object is associated with the source object is empty, it is considered that the first object is irrelevant to the source object, and may be referred to as an object that is irrelevant to the source object.

The touch screen terminal can know each object that exists in the target interface and attribute information of each object. Multiple objects may exist in each interface at the same time. For example, multiple objects such as a game, information, a phone book, a call record, and a briefcase may exist on an interface at the same time.

After obtaining the first object that exists in the target interface, the touch screen terminal may perform display processing on the first object, so that the user can identify, according to the display state of the first object, that the first object is irrelevant to the source object. The display processing performed on the first object may be, but is not limited to, dimming processing. A display state of an object on which dimming processing is performed is dim in the target interface, which indicates that the object is not available and is not selectable. In this embodiment, if an object is dimmed, the user can know that this dimmed object is irrelevant to the source object, and generally, does not place, on the dimmed object, a display icon that corresponds to the source object. Even though the user places, on the dimmed object, the display icon that corresponds to the source object, the touch screen terminal does not perform processing such as searching the object operation database according to the attribute information of the source object and attribute information of the dimmed object, so that the user does not obtain an operation list. Optionally, the touch screen terminal may display that an operation is empty or bounce the display icon that corresponds to the source object to the container interface.

In this embodiment, before receiving an icon placing instruction given by a user, a touch screen terminal first obtains an object in a target interface, where the object in the target interface is irrelevant to a source object, and performs display processing (for example, dimming processing) on the obtained object, so that the user can identify, through a display state of the processed object, the object in the target interface, where the object in the target interface is irrelevant to the source object. Therefore, in one aspect, a probability that the user places, on an irrelevant object, a display icon that corresponds to the source object is lowered, a resource consumed by an invalid operation is saved, and the efficiency of processing the source object may further be improved; and in another aspect, the user may be enabled to differentiate, in the target interface, an object that is relevant to the source object from an object that is irrelevant to the source object, and it is beneficial to guiding the user to place, on different objects, the display icon that corresponds to the source object, more operations on the source object are generated, and multiple types of processing on the source object are completed in the same processing process, which is beneficial to improving the efficiency of processing the source object.

Figure 7:
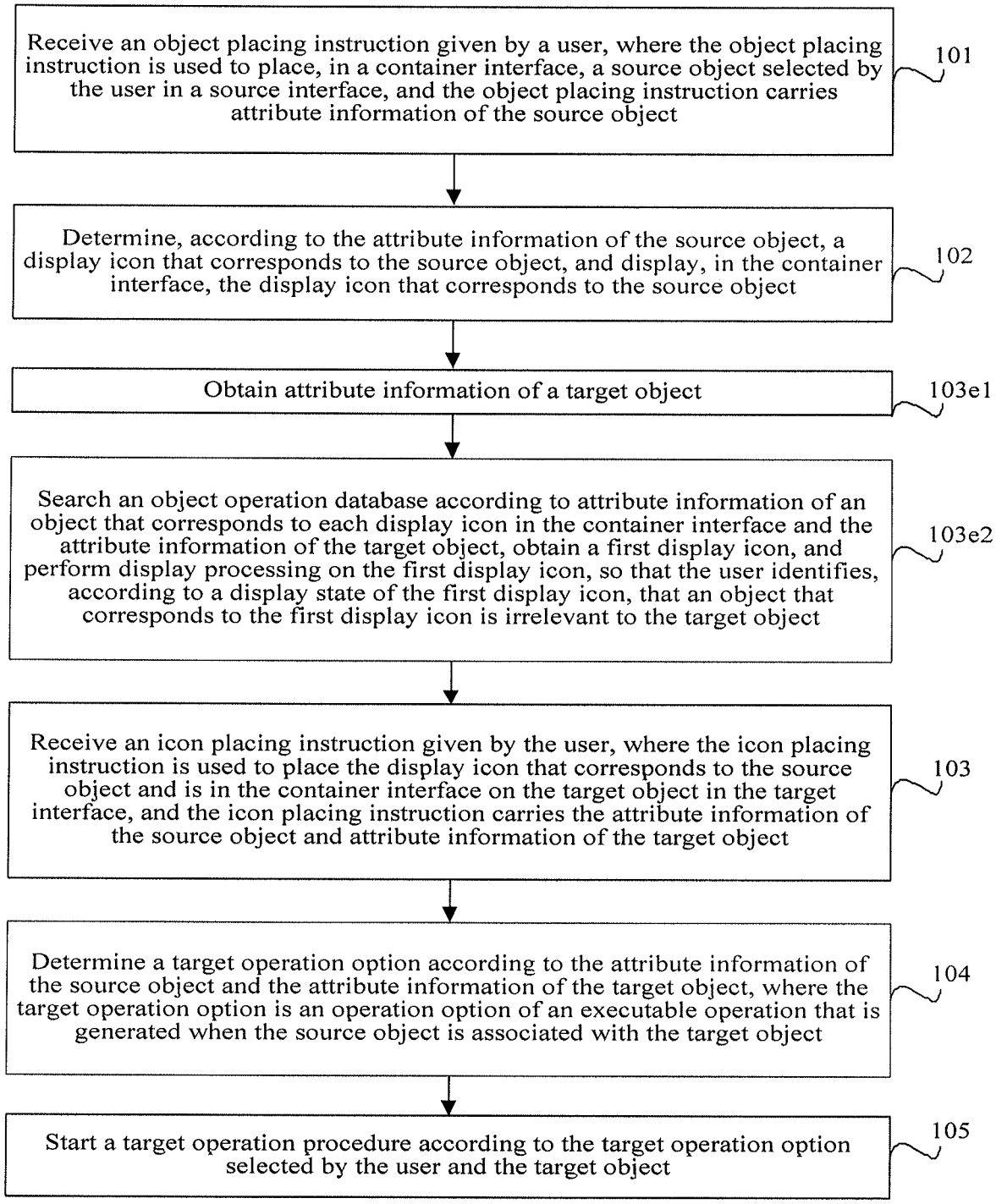
FIG. 7 is a flowchart of a method for processing a touch screen terminal object according to another embodiment of the present invention.

FIG. 7 is a flowchart of a method for processing a touch screen terminal object according to another embodiment of the present invention. This embodiment may be implemented on the basis of any one of the embodiments shown in FIG. 1 to FIG. 5. Implementing this embodiment on the basis of the embodiment shown in FIG. 1 is taken as an example. As shown in FIG. 7, before step 103, the method in this embodiment includes:

Step 103e1: Obtain attribute information of a target object.

Optionally, a touch screen terminal may receive an instruction that a target object is selected in a target interface, where the instruction is given by a user, and obtain attribute information of the target object from the received instruction that the target object is selected. The instruction that the target object is selected carries the attribute information of the target object, where the instruction is given by the user. Optionally, the user may give the instruction that the target object is selected to the touch screen terminal in a manner such as clicking, double clicking, or tapping and holding the target object.

Optionally, because attribute information that corresponds to objects of the same type is basically the same, when only objects of one type currently exist in the target interface, for example, all objects that exist in the target interface are different contacts, these objects belong to objects of the same type and all belong to objects of a contact type, the user may not give the instruction that the target object is selected, but the touch screen terminal directly uses an object of this type as a target object, and then obtains attribute information of the target object. The touch screen terminal can know how many types of objects exist in the target interface, and specifically objects of what type or types. With this manner, an operation of the user may further be reduced, which is beneficial to improving the efficiency that the user processes an object.

Step 103e2: Search an object operation database according to attribute information of an object that corresponds to each display icon in a container interface and the attribute information of the target object, obtain a first display icon, and perform display processing on the first display icon, so that the user identifies, according to a display state of the first display icon, that an object that corresponds to the first display icon is irrelevant to the target object.

The first display icon is a display icon whose executable operation generated when the object that corresponds to the first display icon is associated with the target object is empty.

Specifically, after obtaining attribute information of a source object and the attribute information of the target object and before receiving an icon placing instruction given by the user, the touch screen terminal searches an object operation database according to attribute information of an object that corresponds to each display icon in a container interface and the attribute information of the target object, that is, separately matches attribute information of an object that corresponds to each display icon in the container interface and the attribute information of the target object with attribute information of each object, where the attribute information of each object is stored in the object operation database; and if attribute information of an object that corresponds to a certain display icon in the container interface and the attribute information of the target object are separately matched with attribute information of a certain object in the object operation database, and executable operations that correspond to two matched objects in the object operation database are empty, it is indicated that an object that corresponds to the display icon in the container interface is irrelevant to the target object, and the display icon in the container interface is used as the first display icon. An executable operation generated when an object that corresponds to the first display icon is associated with the target object is empty, that is, the two are irrelevant, which may be referred to as a display icon that is irrelevant to the target object.

The touch screen terminal can know each display icon that currently exist in the container interface, an object that corresponds to each display icon, and attribute information of a corresponding object. Multiple display icons may exist in the container interface at the same time. For example, display icons that correspond to multiple source objects such as an image, music, a text, and a contact may exist in the container interface at the same time.

After obtaining the first display icon that exists in the container interface, the touch screen terminal may perform display processing on the first display icon, so that the user can identify, according to the display state of the first display icon, that the object that corresponds to the first display icon is irrelevant to the target object. The display processing performed on the first display icon may be, but is not limited to, dimming processing. A display state of a display icon on which dimming processing is performed is dim in the container interface, which indicates that the display icon is not available and is not selectable. In this embodiment, if a display icon is dimmed, the user can know that this dimmed display icon is irrelevant to the target object, and generally, does not place the dimmed display icon on the target object. Even though the user places the dimmed display icon on the target object, the touch screen terminal does not perform processing such as searching the object operation database according to the attribute information of the target object and attribute information of an object that corresponds to the dimmed display icon, so that the user does not obtain an operation list. Optionally, the touch screen terminal may display that an operation is empty or bounce the dimmed display icon to the container interface.

In this embodiment, before receiving an icon placing instruction given by a user, a touch screen terminal obtains a display icon of an object in a container interface, where the display icon is irrelevant to the target object, and performs display processing on the obtained display icon, so that the user can identify, according to a display state of the processed display icon, that the object that corresponds to the display icon is irrelevant to the target object. Therefore, in one aspect, a probability that the user places an irrelevant display icon on the target object is lowered, a resource consumed by an invalid operation is saved, and the efficiency of processing a source object may further be improved; and in another aspect, the user may be enabled to differentiate, in the container interface, a display icon that is relevant to the target object from a display icon that is irrelevant to the target object, and it is beneficial to guiding the user to place a relevant display icon on the target object, more operations on the target object are generated, and complete multiple type of processing on the target object are completed in the same processing process, which is beneficial to improving the efficiency of processing an object.

Figure 8:
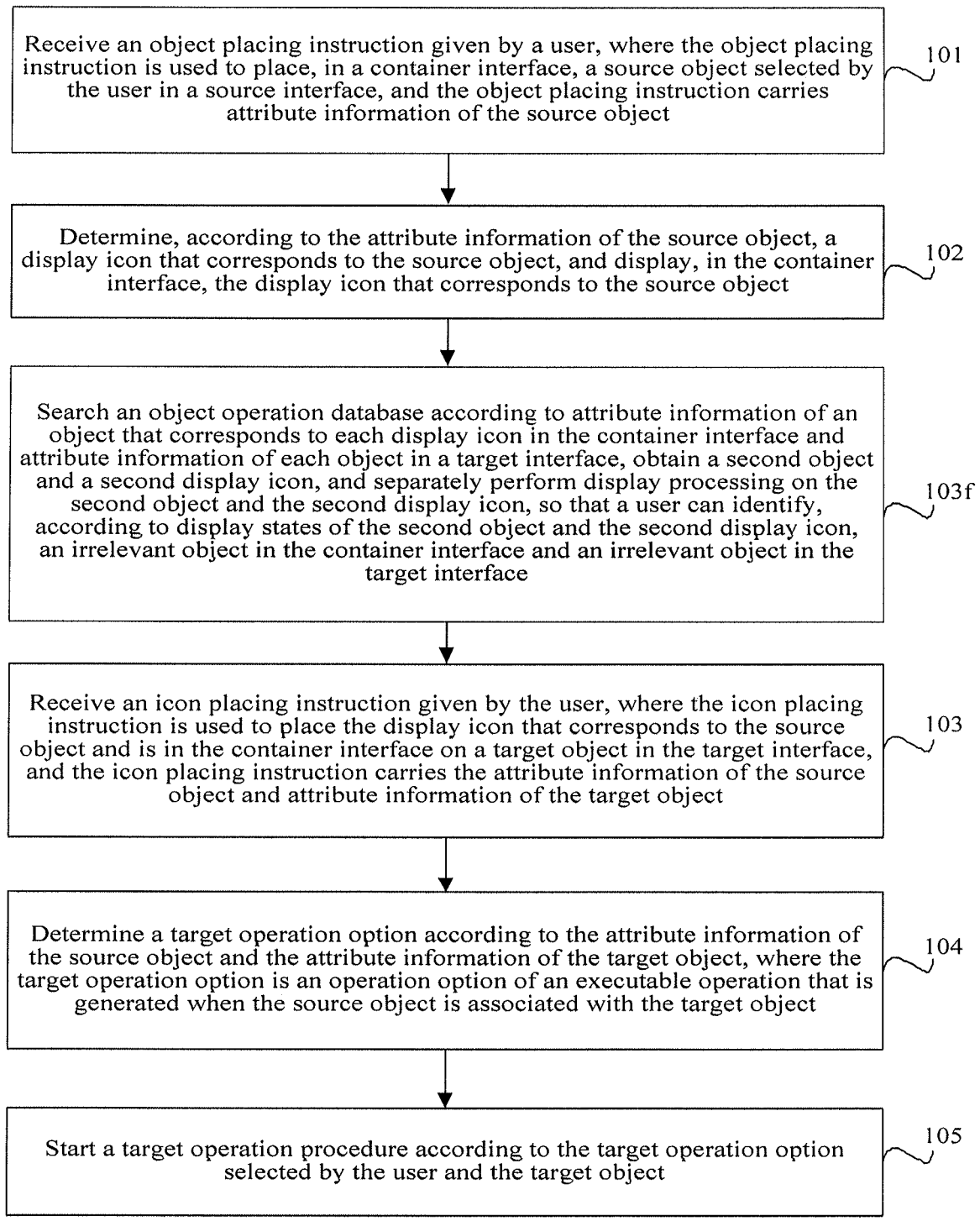
FIG. 8 is a flowchart of a method for processing a touch screen terminal object according to another embodiment of the present invention.

FIG. 8 is a flowchart of a method for processing a touch screen terminal object according to another embodiment of the present invention. This embodiment may be implemented on the basis of any one of the embodiments shown in FIG. 1 to FIG. 5. Implementing this embodiment on the basis of the embodiment shown in FIG. 1 is taken as an example. As shown in FIG. 8, before step 103, the method in this embodiment includes:

Step 103f: Search an object operation database according to attribute information of an object that corresponds to each display icon in a container interface and attribute information of each object in a target interface, obtain a second object and a second display icon, and separately perform display processing on the second object and the second display icon, so that a user can identify, according to display states of the second object and the second display icon, an irrelevant object in the container interface and an irrelevant object in the target interface.

The second object is an object whose executable operation generated when an object that corresponds to each display icon in the container interface is associated with the second object is empty.

The second display icon is a display icon whose executable operation generated when an object that corresponds to the second display icon is associated with each object in the target interface is empty.

Specifically, after obtaining attribute information of a source object and before receiving an icon placing instruction given by a user, a touch screen terminal searches an object operation database according to attribute information of an object that corresponds to each display icon in a container interface and attribute information of each object in a target interface, that is, separately combines attribute information of an object that corresponds to each display icon in the container interface with the attribute information of each object in the target interface, and then matches attribute information of an object that corresponds to a display icon and attribute information of an object in the target interface in each combination with attribute information of each object, where the attribute information of each object is stored in the object operation database; and if attribute information of an object that corresponds to a display icon and attribute information of an object in the target interface in a certain combination are separately matched with attribute information of an object in the object operation database, obtains executable operations that correspond to two matched objects in the object operation database, and if the obtained executable operations are empty, it is indicated that an object that corresponds to a display icon in this combination is irrelevant to the object in the target interface, that is, an executable operation generated when the object that corresponds to the display icon in this combination is associated with the object in the target interface is empty. If an executable operation generated when an object that corresponds to a certain display icon in the container interface is associated to each object in the target interface is empty, it is indicated that the object that corresponds to the display icon in the container interface is irrelevant to any object in the target interface, and the display icon is the second display icon. Similarly, if an executable operation generated when an object that corresponds to each display icon in the container interface is associated with a certain object in the target interface is empty, it is indicated that the object in the target interface is irrelevant to an object that corresponds to each display icon in the container interface, and the object in the target interface is the second object.

The touch screen terminal can know each display icon that currently exists in the container interface, an object that corresponds to each display icon, and attribute information of a corresponding object. Multiple display icons may exist in the container interface at the same time. For example, display icons that correspond to multiple source objects such as an image, music, a text, and a contact may exist in the container interface at the same time.

The touch screen terminal can also know each object in the target interface and attribute information of each object. Multiple objects may exist in each interface at the same time. For example, multiple objects such as a game, information, a phone book, a call record, and a briefcase may exist on an interface at the same time.

After obtaining the second display icon and the second object, the touch screen terminal may perform display processing on the second display icon and the second object, so that the user can identify, according to display states of the second display icon and the second object, an irrelevant object in the container interface and an irrelevant object in the target interface. The display processing performed on the second display icon and the second object may be, but is not limited to, dimming processing. A display state of a display icon on which dimming processing is performed is dim in the container interface, which indicates that the display icon is not available and is not selectable. A display state of an object on which dimming processing is performed is dim in the target interface, which indicates that the object is not available and is not selectable.

In this embodiment, if a display icon is dimmed, the user can know that this dimmed display icon is irrelevant to any object in the target interface, and generally, does not place the dimmed display icon on any object in the target interface.

Even though the user places the dimmed display icon on a certain object in the target interface, the touch screen terminal does not perform processing such as searching the object operation database according to attribute information of an object that corresponds to the dimmed display icon and attribute information of the object on which the dimmed display icon is placed in the target interface, so that the user does not obtain an operation list. Optionally, the touch screen terminal may display that an operation is empty or bounce the dimmed display icon to the container interface.

In addition, in this embodiment, if an object is dimmed, the user can know that this dimmed object is irrelevant to any display icon in the container interface, and generally, does not place any display icon on the dimmed object. Even though the user places a certain display icon on the dimmed object, the touch screen terminal does not perform processing such as searching the object operation database according to attribute information of an object that corresponds to the placed display icon and attribute information of the dimmed object, so that the user does not obtain an operation list. Optionally, the touch screen terminal may display that an operation is empty or bounce a loaded display icon to the container interface.

In this embodiment, before receiving an icon placing instruction given by a user, a touch screen terminal obtains a display icon that is in a container interface and is irrelevant to each object in a target interface and an object that is in the target interface and is irrelevant to each display icon in the container interface, and performs display processing on the obtained display icon and object, so that the user can identify, according to display states of the processed display icon and object, a display icon in the container interface and an object in the target interface that are totally irrelevant to each other. Therefore, in one aspect, a probability that the user places an irrelevant display icon on an irrelevant object is lowered, a resource consumed by an invalid operation is saved, and the efficiency of processing an object may further be improved; and in another aspect, it is beneficial to guiding the user to place a relevant display icon on a relevant object, more operations on each object in the target interface are generated, and multiple types of processing on each object are completed in the same processing process, which is beneficial to improving the efficiency of processing an object.

An implementation process of the technical solutions of the present invention is described in the following with reference to an operation state of a display screen of a touch screen terminal.

Figure 9A:
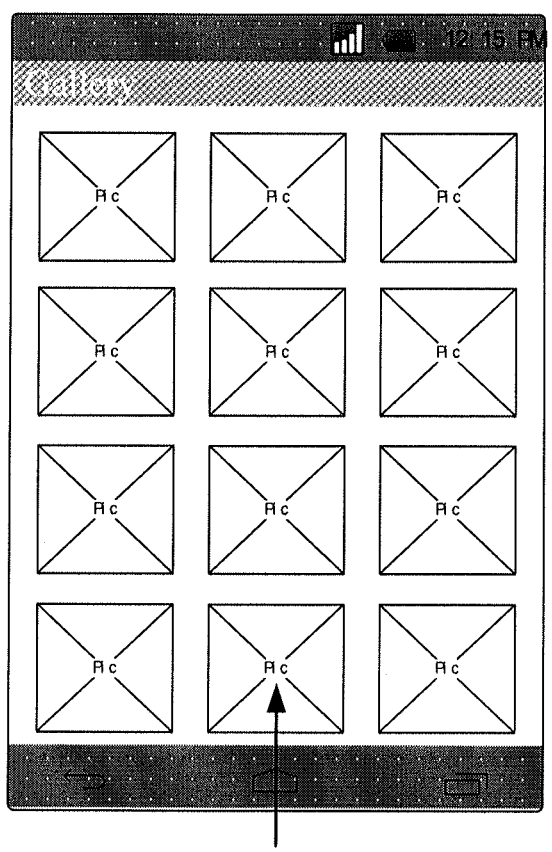
FIG. 9A to FIG. 9G are schematic diagrams showing a state of a display screen in a process of a method for processing a touch screen terminal object according to an embodiment of the present invention.

As shown in FIG. 9A, a user invokes a container interface through a gesture a on any interface. The container interface and an object in the container interface are visually displayed on the display screen. The gesture a is an upward arrow shown in FIG. 9A.

Figure 9B:
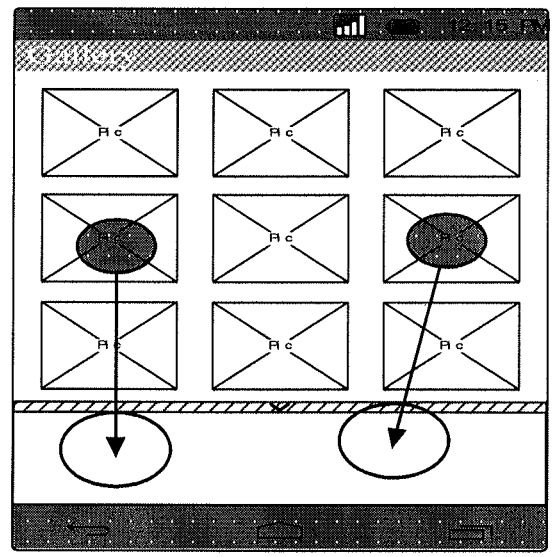

As shown in FIG. 9B, in a case that the container interface is displayed, the user selects an object in a current interface, and places the object in the container interface through a gesture b. The object selected by the user is shown by a solid circle in FIG. 9B. The gesture b is a downward arrow shown in FIG. 9B. Two hollow circles in FIG. 9B indicate positions of two objects.

Figure 9C:
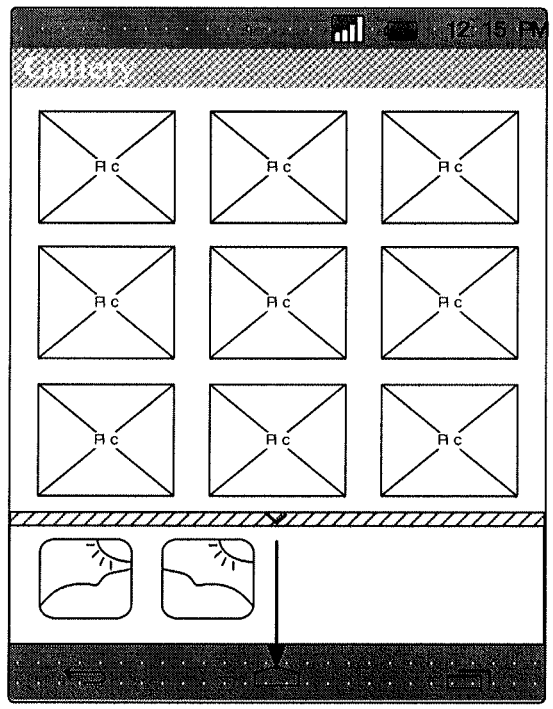

As shown in FIG. 9C, the touch screen terminal analyzes attribute information of the object selected by the user and obtains a display icon that corresponds to the object selected by the user, and converts the selected object in the container interface into a display icon that carries a particular attribute in the container interface.

Figure 9D:
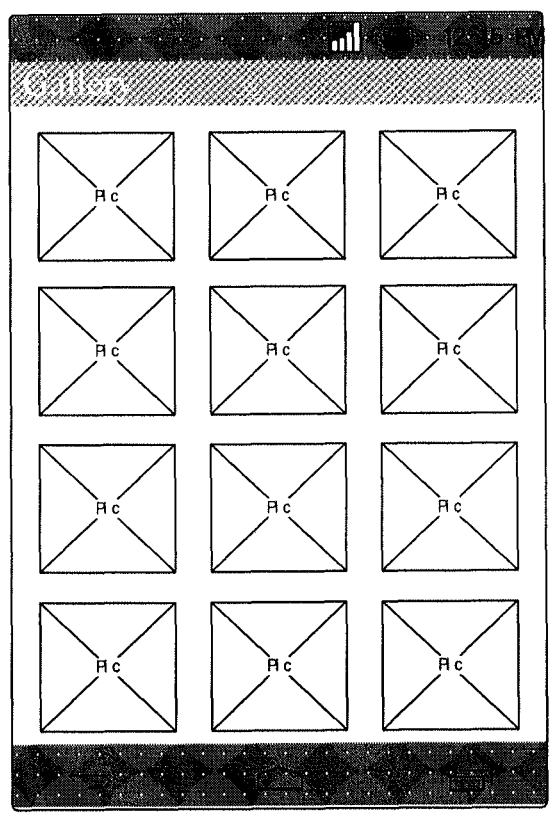

After the user completes a process of placing the selected object, the user closes the container interface through a gesture c. The gesture c is a downward arrow shown in FIG. 9C. A display interface after the container interface is closed is shown in FIG. 9D.

Figure 9E:
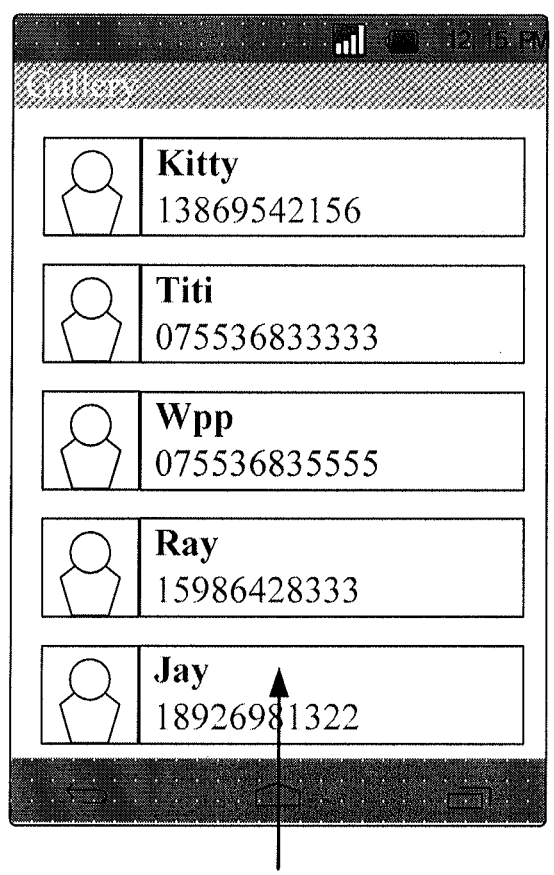

As shown in FIG. 9E, after the user completes interface switching, the user invokes, through a gesture a, the container interface on the target interface that is switched to. The gesture a is an upward arrow shown in FIG. 9E.

Figure 9F:
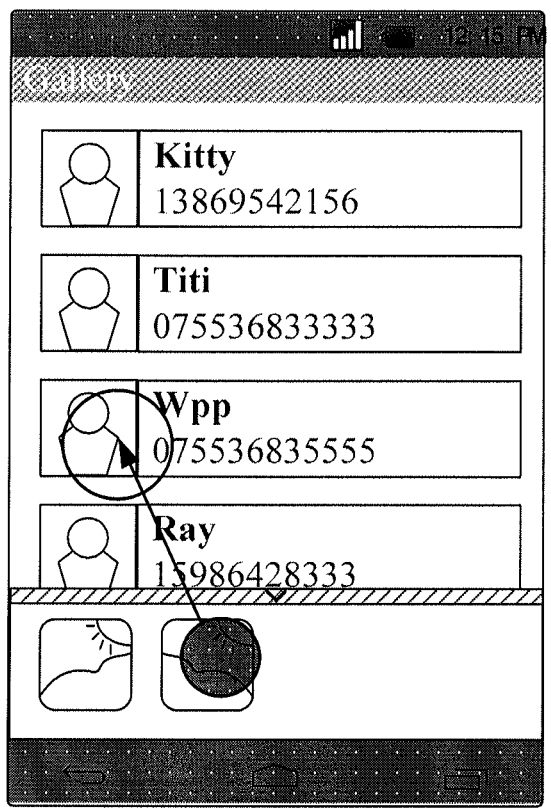

As shown in FIG. 9F, in a case that the container interface is displayed, the user selects a display icon in the container interface, and places the selected display icon on a target object in the target interface through a gesture d. The selected display icon is shown by a solid circle in FIG. 9F; and the target object is shown by a hollow circle in FIG. 9F. The gesture d is shown by an upward arrow in FIG. 9F.

Figure 9G:
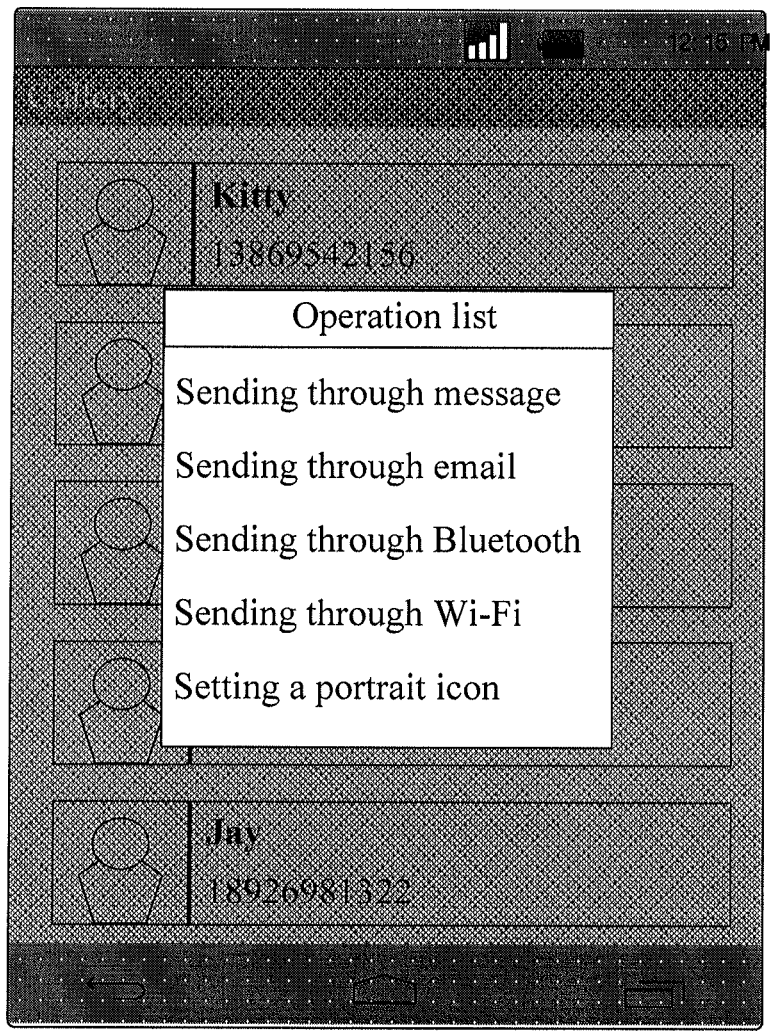

The touch screen terminal performs search according to a moved display icon and attribute information of the target object, and obtains an operation list supported by the two objects, and displays the operation list. The displayed operation list is shown in FIG. 9G.

An implementation process of one kind of dimming processing in the technical solutions of the present invention is described in the following with reference to an operation state of a display screen of a touch screen terminal.

Figure 10A:
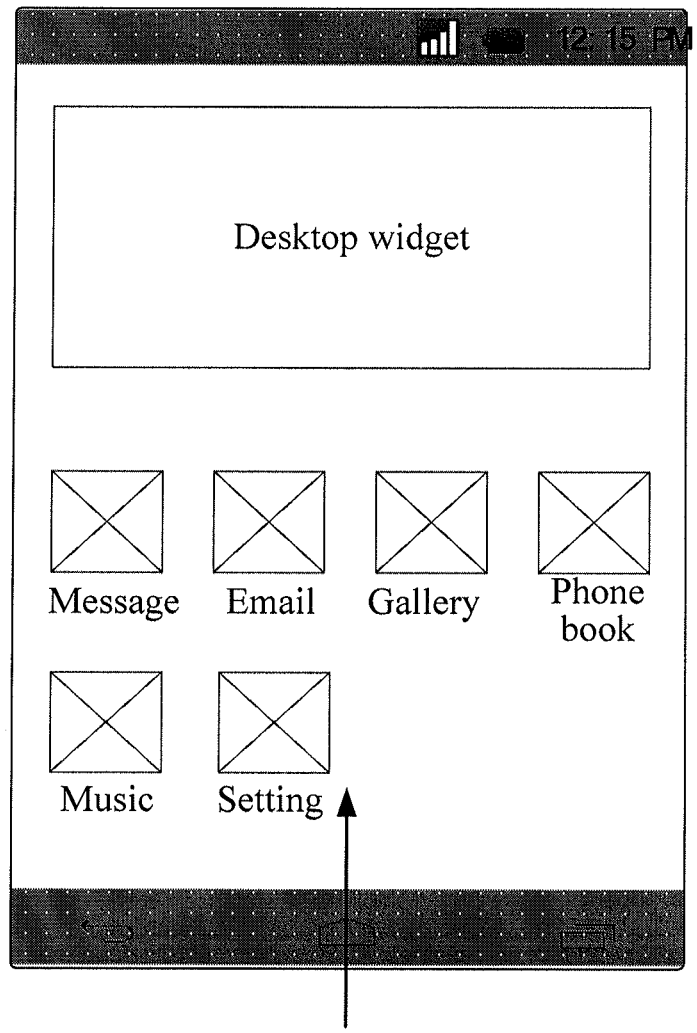
FIG. 10A to FIG. 10C are schematic diagrams showing a state of a display screen in a process of dimming processing according to an embodiment of the present invention.

As shown in FIG. 10A, a user invokes a container interface through a gesture a on any interface. The container interface and an object in the container interface are visually displayed on the interface. The gesture a is an upward arrow shown in FIG. 10A.

Figure 10B:
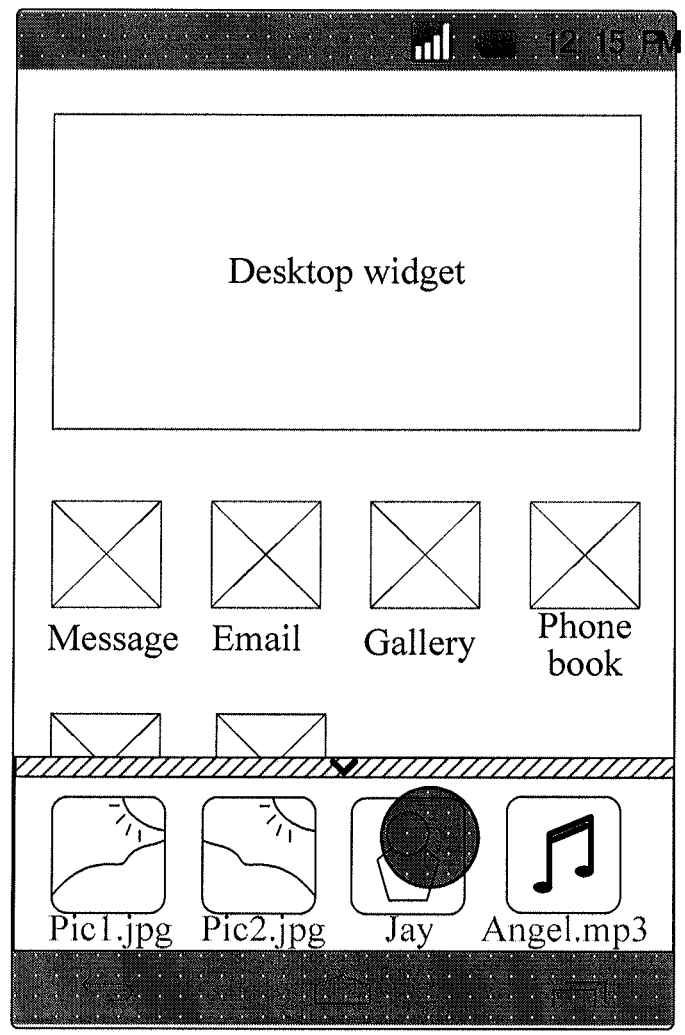
Figure 10C:
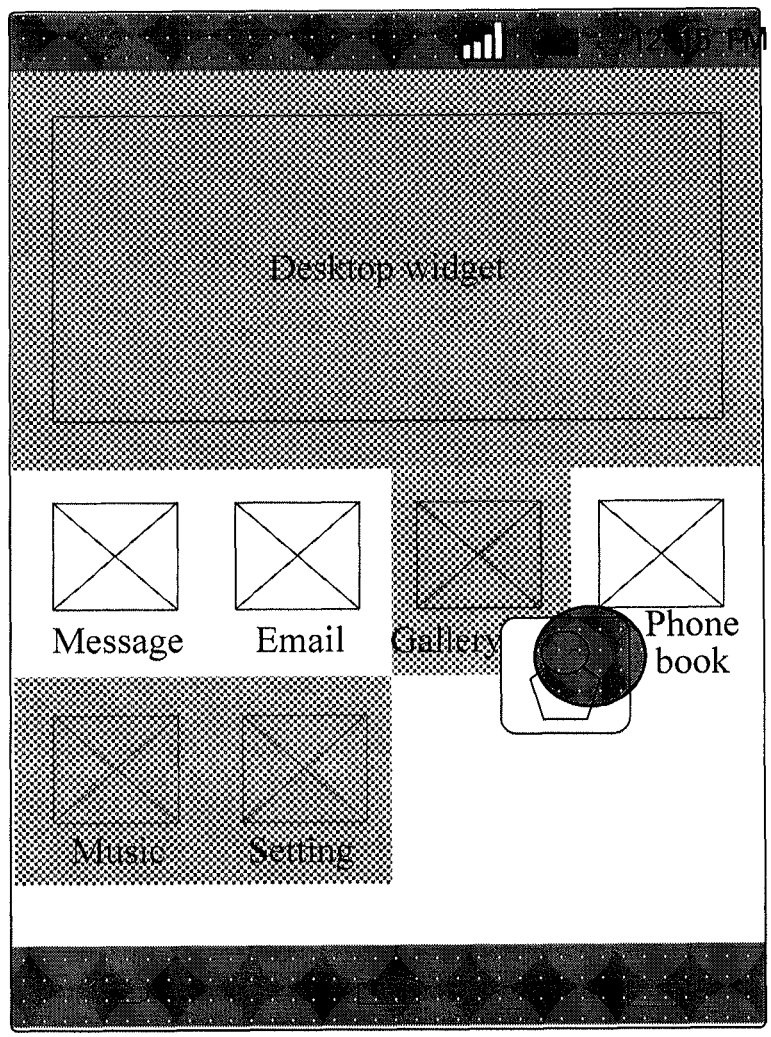

As shown in FIG. 10B, in a case that the container interface is displayed, the user triggers, through a gesture d, operations of selecting and moving an object in the container interface. In this process, the touch screen terminal searches an object operation database according to attribute information of a currently selected display icon, obtains a relevant object and an irrelevant object that exist in a current interface, displays the relevant object as an available state, and performs dimming processing on the irrelevant object and displays the irrelevant object as an unavailable state. A touch screen device may enable an object currently selected by the user not to be placed on an irrelevant object in manners such as processing an interface display manner and limiting a target area. A dimmed display structure is shown in FIG. 10C. Objects in a shadow shown in FIG. 10C are irrelevant objects, that is, dimmed objects.

Solid circles in FIG. 10B and FIG. 10C indicate selected display icons.

An implementation process of another kind of dimming processing in the technical solutions of the present invention is described in the following with reference to an operation state of a display screen of a touch screen terminal.

Figure 11A:
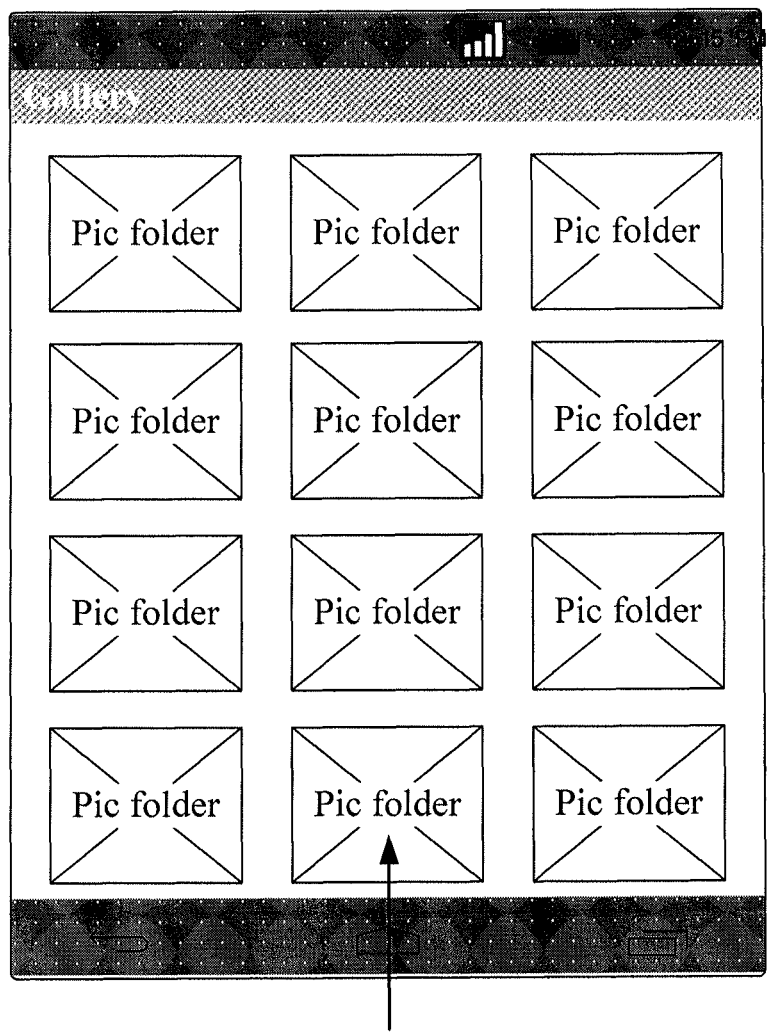
FIG. 11A and FIG. 11B are schematic diagrams showing a state of a display screen in a process of dimming processing according to another embodiment of the present invention.

As shown in FIG. 11A, a user invokes a container interface through a gesture a on any interface. The gesture a is an upward arrow shown in FIG. 11A.

Figure 11B:
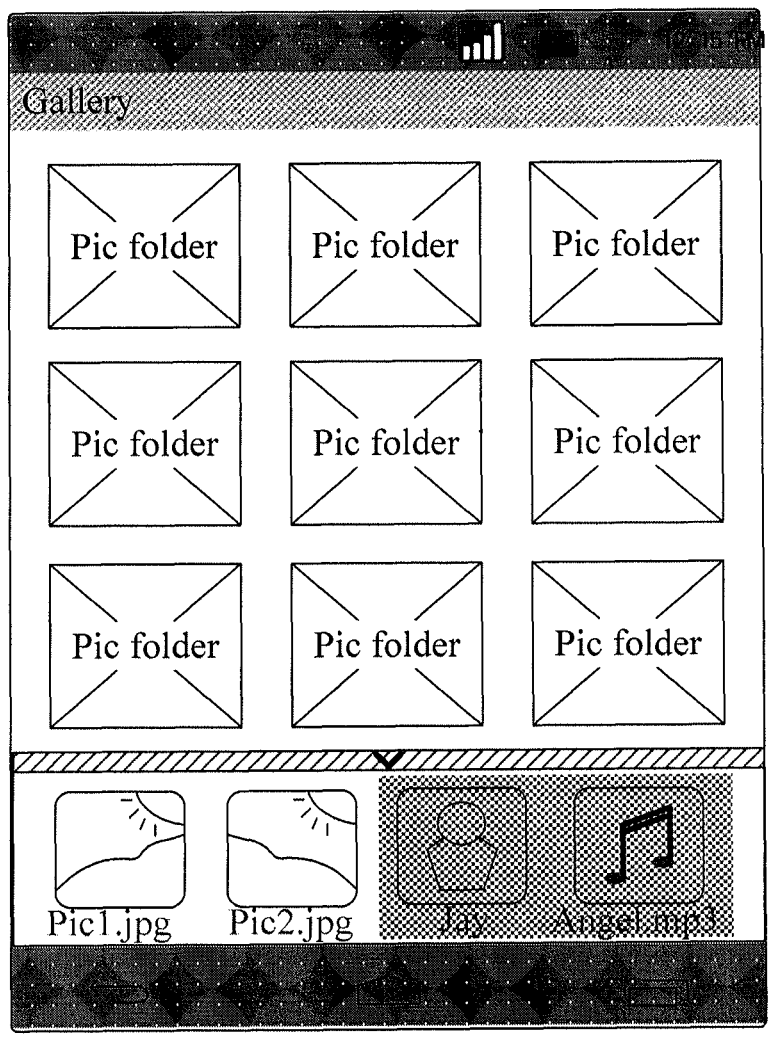

In this process, the touch screen terminal searches an object operation database according to attribute information of objects that correspond to multiple display icons in the container interface, obtains a display icon that is relevant to a target object and a display icon that is irrelevant to the target object, displays the relevant display icon as an available state in the container interface, and performs dimming processing on the irrelevant display icon and displays the irrelevant display icon as an unavailable state in the container interface. The touch screen terminal may enable, in a manner such as processing a display manner and limiting a target area, the user not to select and move, through a gesture d, these display icons that are irrelevant to the target object. A result after the dimming processing is shown in FIG. 11B. Display icons covered in a shadow shown in FIG. 11B are dimmed display icons, that is, irrelevant display icons.

Figure 12:
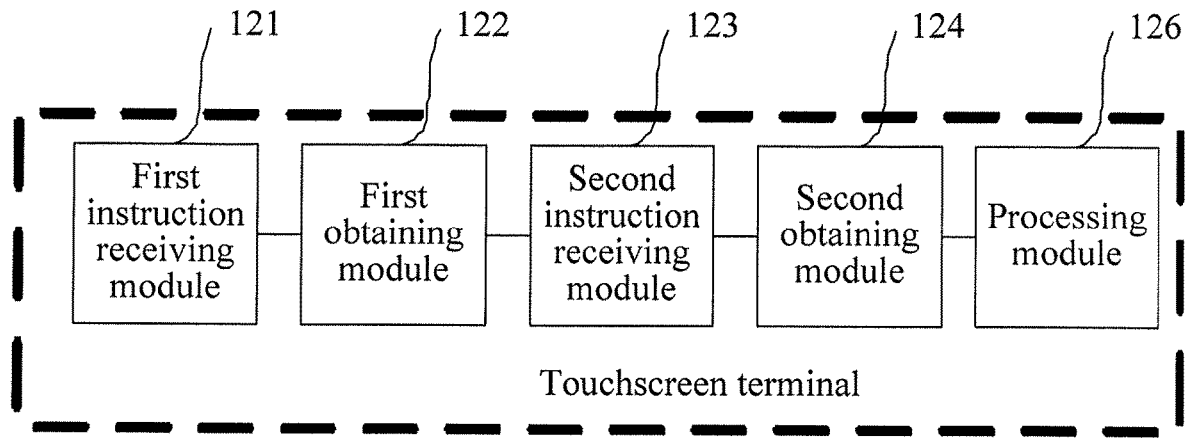
FIG. 12 is a schematic structural diagram of a touch screen terminal according to an embodiment of the present invention.

FIG. 12 is a schematic structural diagram of a touch screen terminal according to an embodiment of the present invention. As shown in FIG. 12, the touch screen terminal in this embodiment includes: a first instruction receiving module 121, a first obtaining module 122, a second instruction receiving module 123, a second obtaining module 124, and a processing module 126.

The first instruction receiving module 121 is configured to receive an object placing instruction given by a user. The object placing instruction is used to place, in a container interface, a source object selected by the user in a source interface, and the object placing instruction carries attribute information of the source object. The source interface is an interface where the source object is located.

Optionally, the container interface may be a display area that is different from the source interface on a display screen of the touch screen terminal in this embodiment.

Optionally, the container interface is located on an interface that is currently displayed on the display screen.

Optionally, the container interface is an interface that is displayed on top on the display screen of the touch screen terminal.

The first obtaining module 122 is connected to the first instruction receiving module 121, and is configured to determine, according to the attribute information of the source object, a display icon that corresponds to the source object, where the attribute information of the source object is received by the first instruction receiving module 121, and place, in the container interface for display, the display icon that corresponds to the source object.

Optionally, the first obtaining module 122 may be specifically configured to search a preset object attribute database according to the attribute information of the source object, obtain the display icon that corresponds to the source object, and display, in the container interface, the display icon that corresponds to the source object. The object attribute database includes attribute information of each object and icon information, which corresponds to each object, in the touch screen terminal in this embodiment.

The second instruction receiving module 123 is connected to the first obtaining module 122 and is configured to receive an icon placing instruction given by the user. The icon placing instruction is used to drag and drop the display icon that corresponds to the source object and is placed by the first obtaining module 122 in the container interface onto a target object in a target interface, and the icon placing instruction carries the attribute information of the source object and attribute information of the target object. The target interface is an interface where the target object is located.

The second obtaining module 124 is connected to the second instruction receiving module 123, and is configured to determine a target operation option according to the attribute information of the source object and the attribute information of the target object in the icon placing instruction that is received by the second instruction receiving module 123. The target operation option is an operation option of an executable operation that is generated when the source object is associated with the target object.

Optionally, the second obtaining module 124 may be specifically configured to search a preset object operation database according to the attribute information of the source object and the attribute information of the target object, and obtain the target operation option. The object operation database mainly includes operation options of executable operations that are generated when objects in the touch screen terminal in this embodiment are associated with each other.

The processing module 126 is connected to the second obtaining module 124, and is configured to start a target operation procedure according to the target operation option obtained by the second obtaining module 124 and the target object.

The attribute information of the source object may include, but is not limited to, at least one piece of the following information: a type of the source object, a name of the source object, and a thumbnail image of the source object. The attribute information of the target object may include, but is not limited to, at least one piece of the following information: a type of the target object and a name of the target object.

Each functional module of the touch screen terminal in this embodiment may be configured to perform the procedure of the method for processing a touch screen terminal object shown in FIG. 1, and its specific working principle is not described herein again and reference is made to the description of the method embodiments.

It should be noted that, in addition to the foregoing functional modules, the touch screen terminal in this embodiment may further include devices such as a processor, a memory, and a power supply, and other devices are not shown in FIG. 12.

The touch screen terminal in this embodiment may be various touch screen devices such as a mobile phone, a tablet personal computer, and an ipad.

In this embodiment, the touch screen terminal generates an object placing instruction by providing a container interface and allowing a user to directly place an object to be processed in the container interface; the touch screen terminal obtains, according to the object placing instruction of the user, a display icon that corresponds to the object to be processed and places the display icon in the container interface, and generates an icon placing instruction by allowing the user to directly place the display icon in the container interface on a target object; and the touch screen terminal displays, according to the icon placing instruction, an executable operation in a manner of an operation option to the user, where the executable operation is generated by the object to be processed and the target object, and then starts a corresponding processing procedure according to a target operation option selected by the user and the target object, thereby reducing the number of times of performing menu selection and interface switch when the user processes the object to be processed, simplifying a process that the user processes an object in the touch screen terminal, and improving the efficiency of processing the object in the touch screen terminal.

Figure 13:
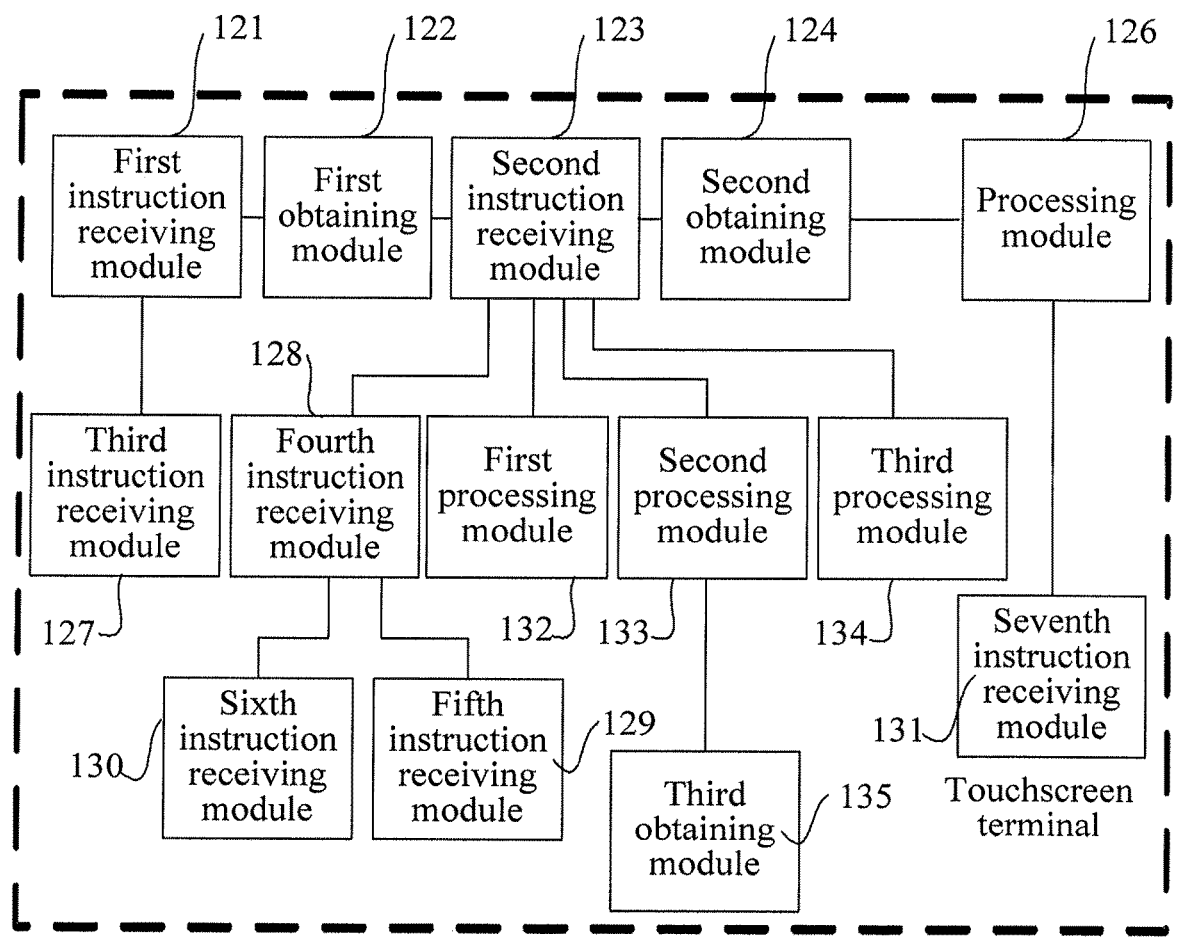
FIG. 13 is a schematic structural diagram of a touch screen terminal according to another embodiment of the present invention.

FIG. 13 is a schematic structural diagram of a touch screen terminal according to another embodiment of the present invention. This embodiment may be implemented on the basis of the embodiment shown in FIG. 12. As shown in FIG. 13, the touch screen terminal in this embodiment further includes: a third instruction receiving module 127.

The third instruction receiving module 127 is configured to, before a first instruction receiving module 121 receives an object placing instruction, receive a container interface invoking instruction given by a user, and display a container interface and a source interface at the same time according to the container interface invoking instruction. Optionally, the third instruction receiving module 127 is connected to the first instruction receiving module 121.

As shown in FIG. 13, the touch screen terminal in this embodiment further includes: a fourth instruction receiving module 128.

The fourth instruction receiving module 128 is configured to, before a second instruction receiving module 123 receives an icon placing instruction, receive an interface switching instruction given by the user, and switch a current interface to a target interface according to the interface switching instruction. Optionally, the fourth instruction receiving module 128 is connected to the second instruction receiving module 123.

As shown in FIG. 13, the touch screen terminal in this embodiment further includes: a fifth instruction receiving module 129.

The fifth instruction receiving module 129 is configured to, before the fourth instruction receiving module 128 receives the interface switching instruction, receive a container interface closing instruction given by the user, and hide the container interface according to the container interface closing instruction. Optionally, the fifth instruction receiving module 129 is connected to the fourth instruction receiving module 128.

As shown in FIG. 13, the touch screen terminal in this embodiment further includes: a sixth instruction receiving module 130.

The sixth instruction receiving module 130 is configured to, after the fourth instruction receiving module 128 receives the interface switching instruction, receive a container interface invoking instruction given by the user, and display the container interface and the target interface at the same time according to the container interface invoking instruction. Optionally, the sixth instruction receiving module 130 is connected to the fourth instruction receiving module 128.

As shown in FIG. 13, the touch screen terminal in this embodiment further includes: a seventh instruction receiving module 131.

The seventh instruction receiving module 131 is configured to, after a processing module 126 starts a target operation procedure according to a target operation option and a target object, receive a container interface closing instruction given by the user, and hide the container interface according to the container interface closing instruction. Optionally, the seventh instruction receiving module 131 is connected to the processing module 126.

In this embodiment, the first instruction receiving module 121 is specifically configured to identify a second gesture according to a preset gesture-instruction mapping table, and obtain the object placing instruction. The second gesture is a gesture that the user performs an operation on a source object on a display screen of the touch screen terminal in this embodiment.

In this embodiment, the second instruction receiving module 123 is specifically configured to identify a third gesture according to the preset gesture-instruction mapping table, and obtain the icon placing instruction. The third gesture is a gesture that the user performs an operation on the target object and a display icon that corresponds to the source object on the display screen of the touch screen terminal in this embodiment.

In this embodiment, the second obtaining module 124 may be further specifically configured to search a preset object operation database according to attribute information of the source object and attribute information of the target object, obtain and display an operation list of the source object, receive an operation selection instruction given by the user, and obtain a target operation option from the operation selection instruction. The operation list of the source object includes at least one operation option of an executable operation that is generated when the source object is associated with the target object. The operation selection instruction includes the target operation option selected by the user from the operation list of the source object.

Further, the second obtaining module 124 is further specifically configured to identify a first gesture according to the preset gesture-instruction mapping table, and obtain the operation selection instruction. The first gesture is a gesture that the user performs an operation on the operation list of the source object on the display screen of the touch screen terminal in this embodiment.

Further, in this embodiment, the attribute information of the source object includes a thumbnail image of the source object. The first obtaining module 122 is specifically configured to search an object attribute database according to the attribute information of the source object, obtain icon information that corresponds to the source object, and combine the thumbnail image of the source object with the icon information that corresponds to the source object, so as to obtain the display icon that corresponds to the source object. In addition, the first obtaining module 122 may further directly use the icon information that is obtained and correspond to the source object as the display icon that corresponds to the source object.

Further, the touch screen terminal in this embodiment further includes: a first processing module 132.

The first processing module 132 is configured to, before the second instruction receiving module 123 receives the icon placing instruction, search an object operation database according to the attribute information of the source object and attribute information of each object in the target interface, obtain a first object, and perform display processing on the first object, so that the user identifies, according to a display state of the first object, that the first object is irrelevant to the source object. The first object is an object whose executable operation generated when the source object is associated with the first object is empty. The display processing on the first object may be, but is not limited to, dimming processing.

Further, the touch screen terminal in this embodiment further includes: a third obtaining module 135 and a second processing module 133.

The third obtaining module 135 is configured to obtain the attribute information of the target object. The second processing module 133 is connected to the third obtaining module 135, and is configured to, before the second instruction receiving module 123 receives the icon placing instruction, search the object operation database according to attribute information of an object that corresponds to each display icon in the container interface and the attribute information of the target object, where the attribute information of the target object is obtained by the third obtaining module 135, obtain a first display icon, and perform display processing on the first display icon, so that the user identifies, according to a display state of the first display icon, that an object that corresponds to the first display icon is irrelevant to the target object. The first display icon is a display icon whose executable operation generated when the object that corresponds to the first display icon is associated with the target object is empty.

Further, the touch screen terminal in this embodiment further includes: a third processing module 134.

The third processing module 134 is configured to, before the second instruction receiving module 123 receives the icon placing instruction, search the object operation database according to attribute information of an object that corresponds to each display icon in the container interface and attribute information of each object in the target interface, obtain a second object and a second display icon, and separately perform display processing on the second object and the second display icon, so that the user identifies, according to display states of the second object and the second display icon, a display icon in the container interface and an object in the target interface that are irrelevant to each other. The second object is an object whose executable operation generated when an object that corresponds to each display icon in the container interface is associated with the second object is empty. The second display icon is a display icon whose executable operation generated when an object that corresponds to the second display icon is associated with each object in the target interface is empty.

It should be noted that, in this embodiment, the first instruction receiving module 121, the second instruction receiving module 123, the third instruction receiving module 127, the fourth instruction receiving module 128, the fifth instruction receiving module 129, the sixth instruction receiving module 130, and the seventh instruction receiving module 131 may be implemented by the same instruction receiving module, and may also be implemented by different instruction receiving modules in specific implementation.

It should be noted that, the touch screen terminal in this embodiment may include one processing module of: the first processing module 132, the second processing module 133, and the third processing module 134, and may also include multiple processing modules at the same time. If the touch screen terminal in this embodiment includes multiple processing modules at the same time, processing modules may be implemented by one processing module in specific implementation, which is not limited herein.

The foregoing functional modules may be configured to perform the corresponding procedures of the methods for processing a touch screen terminal object shown in FIG. 2 to FIG. 8, and their specific working principle is not described herein again and reference is made to the description of the method embodiments.

In this embodiment, the touch screen terminal generates an object placing instruction by providing a container interface and allowing a user to directly place an object to be processed in the container interface; the touch screen terminal obtains, according to the object placing instruction of the user, a display icon that corresponds to the object to be processed and places the display icon in the container interface, and generates an icon placing instruction by allowing the user to directly place the display icon in the container interface on a target object; and the touch screen terminal displays, according to the icon placing instruction, an executable operation in a manner of an operation option to the user, where the executable operation is generated by the object to be processed and the target object, and then starts a corresponding processing procedure according to a target operation option selected by the user and the target object, thereby reducing the number of times of performing menu selection and interface switch when the user processes the object to be processed, simplifying a process that the user processes an object in the touch screen terminal, and improving the efficiency of processing the object in the touch screen terminal.

Persons of ordinary skill in the art may understand that all or part of the steps in each of the foregoing method embodiments may be implemented by a program instructing relevant hardware. The program may be stored in a computer readable storage medium. When the program is run, the steps in each of the foregoing method embodiments are performed. The storage medium includes any medium that is capable of storing program codes, such as a ROM, a RAM, a magnetic disk, or an optical disk.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all technical features of the technical solutions, as long as these modifications or replacements do not cause the essence of corresponding technical solutions to depart from the scope of the technical solutions in the embodiments of the present invention.

What is claimed is:

1. A method for utilizing a container interface of a touch screen terminal having a single touch screen, comprising:
displaying, by the touch screen terminal, a source interface on the touch screen of the touch screen terminal, wherein the displayed source interface includes a plurality of displayed source objects;
receiving, by the touch screen terminal while the source interface is displayed on the touch screen, a container interface invoking instruction via the touch screen of the touch screen terminal based on identifying a first gesture performed on the touch screen, wherein the first gesture is identified based on a mapping of the first gesture to the container interface invoking instruction according to a preset gesture-instruction mapping;
in response to receiving the container interface invoking instruction, displaying, by the touch screen terminal, the container interface overlaid onto a first display area of the source interface displayed on the touch screen, wherein the source interface with the overlaid container interface further includes a source object displayed in a second display area of the source interface;
receiving, by the touch screen terminal, an object placing instruction via the touch screen based on identifying a second gesture performed on the touch screen, wherein the second gesture is different from the first gesture and is identified based on a mapping of the second gesture to the object placing instruction according to the preset gesture-instruction mapping;
in response to receiving the object placing instruction, displaying, by the touch screen terminal, an icon corresponding to the source object in the container interface;
receiving, by the touch screen terminal, an interface switching instruction via the touch screen based on identifying a third gesture performed on the touch screen, wherein the third gesture is different from the first and second gestures and is identified based on a mapping of the third gesture to the interface switching instruction according to the preset gesture-instruction mapping;
after receiving the interface switching instruction, displaying, by the touch screen terminal, the container interface on a first display area of a target interface displayed on the touch screen, wherein displaying the container interface on the first display area of the target interface includes displaying the icon corresponding to the source object in the container interface; and receiving, by the touch screen terminal, an icon placing instruction via the touch screen based on identifying a fourth gesture performed on the touch screen, wherein the fourth gesture corresponds to dragging the icon from the container interface displayed on the first display area of the target interface and dropping the icon onto a target object in a second display area of the target interface, wherein the target object is a folder, wherein the fourth gesture is identified based on a mapping of the fourth gesture to the icon placing instruction according to the preset gesture-instruction mapping, and wherein the container interface is automatically closed after receiving the icon placing instruction;

wherein the container interface is overlaid on top of the same portion of the source interface of the touch screen and the target interface of the touch screen such that the first display area of the source interface and the first display area of the target interface correspond to the same area of the touch screen;

wherein before displaying the icon corresponding to the source object in the container interface, the method further comprises: determining, according to attribute information of the source object indicating a source object type corresponding to the source object, a type of icon to be displayed that corresponds to the source object, wherein different source object types correspond to different types of icons;

wherein the container interface displayed in response to receiving the container interface invoking instruction comprises multiple displayed icons, and wherein the method further comprises: determining relevant and irrelevant objects corresponding to the multiple displayed icons of the container interface, wherein a displayed icon corresponding to an irrelevant object in the container interface is displayed in a dimmed manner which distinguishes the irrelevant object in the container interface from a relevant object in the container interface.

2. The method of claim 1, wherein the second gesture comprises clicking the source object in the source interface.

3. The method of claim 1, wherein the second gesture comprises pressing and holding the source object in the source interface, dragging the source object into the container interface, and releasing the source object.

4. The method according to claim 1, wherein determining the type of icon that corresponds to the source object further comprises:

searching an object attribute database which comprises attribute information of each source object of the touch screen terminal and icon information corresponding thereto.

5. The method according to claim 1, wherein determining the type of icon that corresponds to the source object further comprises:

determining a name suffix of the source object.

6. The method of claim 1, wherein after receiving the icon placing instruction, the method further comprises:

displaying an operation list for the icon dropped onto the target object, wherein the operation list includes a list of performable operations based on an association between the source object and the target object;

receiving an operation selection instruction based on the displayed operation list; and executing an operation corresponding to the operation selection instruction.

7. The method of claim 1, further comprising:

determining, for the source object corresponding to the icon in the container interface, relevant and irrelevant target objects on the target interface;

wherein, while the icon is being dragged from the container interface displayed on the first display area of the target interface, irrelevant target objects on the target interface are displayed in a dimmed manner which distinguishes the irrelevant target objects on the target interface from the relevant target objects on the target interface.

8. The method of claim 7, wherein the irrelevant target objects on the target interface are in an unavailable state such that a drag-and-drop operation onto the irrelevant target objects is prohibited.

9. A touch screen terminal, comprising a processor, a non-transitory memory, and a single touch screen, wherein the non-transitory memory has processor-executable instructions stored thereon, and wherein the processor is configured to execute the processor-executable instructions to facilitate:

displaying a source interface on the touch screen of the touch screen terminal, wherein the displayed source interface includes a plurality of displayed source objects;

receiving, while the source interface is displayed on the touch screen, a container interface invoking instruction via the touch screen based on identifying a first gesture performed on the touch screen, wherein the first gesture is identified based on a mapping of the first gesture to the container interface invoking instruction according to a preset gesture-instruction mapping;

in response to receiving the container interface invoking instruction, displaying a container interface overlaid onto a first display area of the source interface displayed on the touch screen, wherein the source interface with the overlaid container interface further includes a source object displayed in a second display area of the source interface;

receiving an object placing instruction via the touch screen based on identifying a second gesture performed on the touch screen, wherein the second gesture is different from the first gesture and is identified based on a mapping of the second gesture to the object placing instruction according to the preset gesture-instruction mapping;

in response to receiving the object placing instruction, displaying an icon corresponding to the source object in the container interface;

receiving an interface switching instruction via the touch screen based on identifying a third gesture performed on the touch screen, wherein the third gesture is different from the first and second gestures and is identified based on a mapping of the third gesture to the interface switching instruction according to the preset gesture-instruction mapping;

after receiving the interface switching instruction, displaying the container interface on a first display area of a target interface displayed on the touch screen, wherein displaying the container interface on the first display area of the target interface includes displaying the icon corresponding to the source object in the container interface; and receiving an icon placing instruction via the touch screen based on identifying a fourth gesture performed on the touch screen, wherein the fourth gesture corresponds to dragging the icon from the container interface displayed on the first display area of the target interface and dropping the icon onto a target object in a second display area of the target interface, wherein the target object is a folder, wherein the fourth gesture is identified based on a mapping of the fourth gesture to the icon placing instruction according to the preset gesture-instruction mapping, and wherein the container interface is automatically closed after receiving the icon placing instruction;

wherein the container interface is overlaid on top of the same portion of the source interface of the touch screen and the target interface of the touch screen such that the first display area of the source interface and the first display area of the target interface correspond to the same area of the touch screen;

wherein the processor is further configured to execute the processor-executable instructions to facilitate: before displaying the icon corresponding to the source object in the container interface, determining, according to attribute information of the source object indicating a source object type corresponding to the source object, a type of icon to be displayed that corresponds to the source object, wherein different source object types correspond to different types of icons;

wherein the container interface displayed in response to receiving the container interface invoking instruction comprises multiple displayed icons, and wherein the processor is further configured to execute the processor-executable instructions to facilitate: determining relevant and irrelevant objects corresponding to the multiple displayed icons of the container interface, wherein a displayed icon corresponding to an irrelevant object in the container interface is displayed in a dimmed manner which distinguishes the irrelevant object in the container interface from a relevant object in the container interface.

10. The touch screen terminal according to claim 9, wherein the second gesture comprises clicking the source object in the source interface.

11. The touch screen terminal according to claim 9, wherein the second gesture comprises pressing and holding the source object in the source interface, dragging the source object into the container interface, and releasing the source object.

12. A non-transitory computer-readable medium having processor-executable instructions stored thereon, wherein the processor-executable instructions, when executed, facilitate:

displaying, by a touch screen terminal having a single touch screen, a source interface on the touch screen, wherein the displayed source interface includes a plurality of displayed source objects;

receiving, while the source interface is displayed on the touch screen, a container interface invoking instruction via the touch screen of the touch screen terminal based on identifying a first gesture performed on the touch screen, wherein the first gesture is identified based on a mapping of the first gesture to the container interface invoking instruction according to a preset gesture-instruction mapping;

in response to receiving the container interface invoking instruction, displaying a container interface overlaid onto a first display area of the source interface displayed on the touch screen, wherein the source interface with the overlaid container interface further includes a source object displayed in a second display area of the source interface;

receiving an object placing instruction via the touch screen based on identifying a second gesture performed on the touch screen, wherein the second gesture is different from the first gesture and is identified based on a mapping of the second gesture to the object placing instruction according to the preset gesture-instruction mapping;

in response to receiving the object placing instruction, displaying an icon corresponding to the source object in the container interface;

receiving an interface switching instruction via the touch screen based on identifying a third gesture performed on the touch screen, wherein the third gesture is different from the first and second gestures and is identified based on a mapping of the third gesture to the interface switching instruction according to the preset gesture-instruction mapping;

after receiving the interface switching instruction, displaying the container interface on a first display area of a target interface displayed on the touch screen, wherein displaying the container interface on the first display area of the target interface includes displaying the icon corresponding to the source object in the container interface; and receiving an icon placing instruction via the touch screen based on identifying a fourth gesture performed on the touch screen, wherein the fourth gesture corresponds to dragging the icon from the container interface displayed on the first display area of the target interface and dropping the icon onto a target object in a second display area of the target interface, wherein the target object is a folder, wherein the fourth gesture is identified based on a mapping of the fourth gesture to the icon placing instruction according to the preset gesture-instruction mapping, and wherein the container interface is automatically closed after receiving the icon placing instruction;

wherein the container interface is overlaid on top of the same portion of the source interface of the touch screen and the target interface of the touch screen such that the first display area of the source interface and the first display area of the target interface correspond to the same area of the touch screen;

wherein the processor-executable instructions, when executed, further facilitate: before displaying the icon corresponding to the source object in the container interface, determining, according to attribute information of the source object indicating a source object type corresponding to the source object, a type of icon to be displayed that corresponds to the source object, wherein different source object types correspond to different types of icons;

wherein the container interface displayed in response to receiving the container interface invoking instruction comprises multiple displayed icons, and wherein the processor-executable instructions, when executed, further facilitate: determining relevant and irrelevant objects corresponding to the multiple displayed icons of the container interface, wherein a displayed icon corresponding to an irrelevant object in the container interface is displayed in a dimmed manner which distinguishes the irrelevant object in the container interface from a relevant object in the container interface.

13. The non-transitory computer-readable medium according to claim 12, wherein the second gesture comprises clicking the source object in the source interface.

14. The non-transitory computer-readable medium according to claim 12, wherein the second gesture comprises pressing and holding the source object in the source interface, dragging the source object into the container interface, and releasing the source object.

* * * * *